US012687880B2

(12) United States Patent
Marquez et al.

(10) Patent No.: US 12,687,880 B2
(45) Date of Patent: Jul. 21, 2026

(54) PHOTONIC PROCESSOR WITH MULTIPLE LAYERS OF FEEDBACK FOR DIGITAL CURRENCY TRANSACTIONS

(71) Applicant: Milkshake Technology Inc., Menlo Park, CA (US)

(72) Inventors: Bicky A. Marquez, Kingston (CA); Ahmed Khaled, Kingston (CA); Joshua S. J. Baxter, Ottawa (CA); Alireza Samani, Ottawa (CA); Orad Reshef, Ottawa (CA); Bhavin J. Shastri, Kingston (CA); Douglas H. Wightman, Kingston (CA)

(73) Assignee: Milkshake Technology Inc., Menlo Park, CA (US)

( * ) Notice: Subject to any disclaimer, the term of this patent is extended or adjusted under 35 U.S.C. 154(b) by 269 days.

(21) Appl. No.: 18/414,647

(22) Filed: Jan. 17, 2024

(65) Prior Publication Data

US 2025/0231578 A1     Jul. 17, 2025

(51) Int. Cl.
*G06E 1/04*        (2006.01)
*H04L 9/06*        (2006.01)
*H04L 9/08*        (2006.01)

(52) U.S. Cl.
CPC .............. *G06E 1/04* (2013.01); *H04L 9/0643* (2013.01); *H04L 9/0819* (2013.01)

(58) Field of Classification Search
CPC ..... H04L 1/12; H04L 1/02; H04L 1/16; H04L 1/18; H04L 5/02; H04L 5/14; H04L 5/22;
(Continued)

(56) References Cited

U.S. PATENT DOCUMENTS

| | | | |
|---|---|---|---|
| 5,379,309 A * | 1/1995 | Logan, Jr. ............. | H01S 5/4006 372/18 |
| 8,681,982 B2 | 3/2014 | Wiseman et al. | |

(Continued)

FOREIGN PATENT DOCUMENTS

| | | | |
|---|---|---|---|
| CN | 101142468 A * | 3/2008 | ................ G01J 1/44 |
| EP | 3506190 A1 | 7/2019 | |
| JP | 2001177521 A * | 6/2001 | |

OTHER PUBLICATIONS

Hamed Alipour-Banaei et al. , "Photonic crystal based 1-bit full-adder optical circuit by using ring resonators in a nonlinear structure," Mar. 9, 2017, Photonics and Nanostructures—Fundamentals and Applications 24 (2017) ,pp. 29-31.*

(Continued)

*Primary Examiner* — Omar S Ismail
(74) *Attorney, Agent, or Firm* — Fenwick & West LLP

(57) ABSTRACT

A photonic processor with multiple layers of feedback. At least one of a first set of photonic adders in the photonic processor includes a feedback path feeding a first feedback signal from a carry output to an input of the at least one first photonic adder. The at least one first photonic adder generates a photonic sum based in part on the first feedback signal. At least one of a second set of photonic adders in the photonic processor includes a feedback path feeding a second feedback signal from a carry output to an input of the least one second photonic adder. The at least one second photonic adder generates an updated version of a photonic input signal based in part on the second feedback signal and the photonic sum. A feedback interface feeds the updated version of the photonic input signal back to an input of the photonic processor.

20 Claims, 8 Drawing Sheets

(58) Field of Classification Search

CPC ..... H04L 9/14; H04L 9/18; H04L 9/28; H04L 9/20; H04L 7/04; H04L 7/02; H04L 5/06; H04L 12/02; H04L 12/28; H04L 12/16; H04L 12/40; H04L 12/42; H04L 12/50; H04L 13/02; H04L 15/04; H04L 15/24; H04L 17/02; H04L 17/16; H04L 25/02; H04L 25/30; H04L 25/38; H04L 27/02; H04L 27/10; H04L 27/18; H04L 27/26; H04L 27/32; H04L 41/02; H04L 41/04; H04L 41/06; H04L 41/08; H04L 41/12; H04L 41/14; H04L 41/0246; H04L 41/0654; H04L 41/0803; H04L 41/085; H04L 41/0866; H04L 41/0896; H04L 41/34; H04L 41/50; H04L 41/5019; H04L 41/5003; H04L 41/5041; H04L 41/5061; H04L 45/00; H04L 45/02; H04L 45/12; H04L 45/24; H04L 45/48; H04L 45/58; H04L 45/645; H04L 45/74; H04L 45/745; H04L 45/80; H04L 45/85; H04L 47/10; H04L 47/50; H04L 47/70; H04L 49/10; H04L 49/15; H04L 49/20; H04L 49/25; H04L 49/35; H04L 49/50; H04L 49/55; H04L 49/505; H04L 49/90; H04L 51/04; H04L 51/06; H04L 51/07; H04L 51/21; H04L 61/09; H04L 61/30; H04L 61/45; H04L 61/50; H04L 65/10; H04L 65/1066; H04L 65/40; H04L 65/60; H04L 67/01; H04L 67/14; H04L 67/2866; H04L 67/50; H04L 69/08; H04L 69/16; H04L 69/30; H04L 101/30; H04L 101/60

See application file for complete search history.

(56) References Cited

U.S. PATENT DOCUMENTS

| | | | |
|---|---|---|---|
| 10,924,269 B1 | 2/2021 | Ding et al. | |
| 11,238,428 B1* | 2/2022 | Nagarajan | H04L 9/0618 |
| 11,251,947 B1 | 2/2022 | Wang et al. | |
| 2002/0018278 A1* | 2/2002 | Sato | G02F 1/136209 359/254 |
| 2002/0102046 A1* | 8/2002 | Newberg | H04Q 11/0005 385/17 |
| 2002/0141015 A1* | 10/2002 | Chang | H04Q 11/0062 398/43 |
| 2002/0141409 A1* | 10/2002 | Chang | H04L 12/1836 398/166 |
| 2002/0145786 A1* | 10/2002 | Chang | H04Q 11/0062 398/43 |
| 2002/0159686 A1* | 10/2002 | Madsen | G02B 6/1225 385/27 |
| 2004/0213229 A1* | 10/2004 | Chang | H04J 14/0227 370/432 |
| 2005/0177093 A1* | 8/2005 | Barry | A61N 5/0616 604/20 |
| 2008/0008474 A1* | 1/2008 | Boduch | H04J 14/0217 398/68 |
| 2009/0116522 A1* | 5/2009 | Watson | H01S 5/12 257/E33.001 |
| 2011/0001529 A1* | 1/2011 | Gendai | H03G 3/301 327/161 |
| 2014/0193164 A1* | 7/2014 | Ide | H04B 10/6933 398/210 |
| 2020/0053851 A1* | 2/2020 | De Wilde | H04B 10/116 |
| 2020/0327093 A1 | 10/2020 | Nagarajan | |
| 2021/0305778 A1* | 9/2021 | Sato | H01S 5/0687 |
| 2022/0044100 A1* | 2/2022 | Yoo | G11C 11/54 |
| 2022/0166613 A1 | 5/2022 | Cruz et al. | |
| 2023/0400627 A1* | 12/2023 | Song | G02B 6/13 |
| 2024/0421913 A1* | 12/2024 | Tarof | H04Q 11/0066 |
| 2025/0070886 A1* | 2/2025 | Tarof | H04B 10/70 |

OTHER PUBLICATIONS

Benshan Wang et al. , "Multi-Wavelength Photonic Neuromorphic Computing for Intra and Inter-Channel Distortion Compensations in WDM Optical Communication Systems," Oct. 10, 2022, IEEE Journal of Selected Topics in Quantum Electronics, vol. 29, No. 2, Mar./Apr. 2023, pp. 1-8.*

Daniel Pérez-López et al.,"Multipurpose self-configuration of programmable photonic circuits, "Dec. 11, 2020, Nature Communications , 2020, 11:6359,pp. 1-9.*

Alexander N. Tait et al.,"Neuromorphic photonic networks using silicon photonic weight banks," Aug. 7, 2017, Scientific Reports, 7:7430, pp. 1-7.*

Daniel Pérez et al.,"Programmable multifunctional integrated nanophotonics," Jun. 14, 2018, Nanophotonics 2018; 7(8),pp. 1351-1367.*

Zefeng Xu et al.,"Reconfigurable nonlinear photonic activation function for photonic neural network based on non-volatile opto-resistive RAM switch, "Oct. 6, 2022, Light: Science & Applications (2022) 11:288,pp. 1-9.*

K. Rama Prabha et al.,"Two-dimensional photonic crystal-based half adder: a review," Jan. 18, 2022, J Opt (Jun. 2022) 51(2), pp. 415-433.*

Bo Xu et al.,"Recent Progress of Neuromorphic Computing Based on Silicon Photonics: Electronic-Photonic Co-Design, Device, and Architecture," Sep. 27, 2022, Photonics 2022,9,698, pp. 1-17.*

Nicholas C. Harris et al.,"Linear programmable nanophotonic processors," Dec. 20, 2018, Optica, Optical Society of America, vol. 4, No. 12, pp. 1623-1629.*

Zhoufeng Ying et al.,"Electronic-photonic arithmetic logic unit for high-speed computing," May 1, 2020, Nature Communications | (2020). 1:2154,pp. 1-5.*

Kamanashis Goswami et al.,"A review on all-optical logic adder: Heading towards next-generation processor," Nov. 30, 2020 , Optics Communications 483 (2021),pp. 1-12.*

Alipour-Banaei, H., et al., "Photonic crystal based 1-bit full-adder optical circuit by using ring resonators in a nonlinear structure," Photonics and Nanostructures—Fundamentals and Applications, vol. 24, May 2017, pp. 29-34.

Caulfield, H.J., et al., "Why future supercomputing requires optics," Nature Photonics, vol. 4, Jan. 2010, pp. 261-263.

Chen, H., et al., "100-Gbps RZ Data Reception in 67-GHz Si-Contacted Germanium Waveguide p-i-n Photodetectors," Journal of Lightwave Technology, vol. 35, No. 4, pp. 722-726, Feb. 15, 2017, doi: 10.1109/JLT.2016.2593942.

Green, W., et al., "Ultra-compact, low RF power, 10 GB/s silicon Mach-Zehnder modulator," Optics Express, vol. 15, No. 25, 2007, pp. 17106-17113.

International Search Report and Written Opinion, Patent Cooperation Treaty Application No. PCT/CA2022/051712, dated Feb. 15, 2023, 8 pages.

International Search Report and Written Opinion, Patent Cooperation Treaty Application No. PCT/CA2022/051713, dated Feb. 23, 2023, 9 pages.

Kumar, A., et al., "All-optical NOT and AND gates based on 2D nonlinear photonic crystal ring resonant cavity," Optik, vol. 167, Aug. 2018, pp. 164-169.

Miller, D., "Are optical transistors the logical next step?" Nature Photonics, vol. 4, Jan. 2010, pp. 3-5.

Miller, D., "The role of optics in computing," Nature Photonics, vol. 4, Jan. 2010, p. 406.

Mohebzadeh-Bahabady, A., et al., "Proposal of a Cascade Photonic Crystal XOR Logic Gate for Optical Integrated Circuits with Investigation of Fabrication Error and Optical Power Changes," Photonics 2021, vol. 8, Article 392, 13 pages.

Mostafa, T.S., et al., "Ultra-High bit rate all-optical AND/OR logic gates based on photonic crystal with multi-wavelength simultaneous operation," Journal of Modern Optics, 2019, vol. 66, Issue 9, pp. 1005-1016.

Tait, A. N., "Quantifying power use in silicon photonic neural networks," arXiv preprint arXiv:2108.04819, 2021, pp. 1-28.

(56) References Cited

OTHER PUBLICATIONS

Timurdogan, E., et al., "An ultralow power athermal silicon modulator," Nature Communications, vol. 5, Article No. 4008, 2014, pp. 1-11.

Tucker, R.S., "The role of optics in computing," Nature Photonics, vol. 4, Jan. 2010, p. 405.

Xiao, X., et al., "60 Gbit/s Silicon Modulators with Enhanced Electro-optical Efficiency," in Optical Fiber Communication Conference/National Fiber Optic Engineers Conference 2013, OSA Technical Digest (online) (Optical Society of America, 2013), paper OW4J.3, 3 pages.

Xu, Q., et al., "Silicon microring resonators with 1.5-$\mu$m radius," Optics Express, vol. 16, No. 6, 2008, pp. 4309-4315.

* cited by examiner

Thresholder Model
450

Transfer
Function
452

Region
460

Region
457

Region
455

Input
Amplitude 1.00

0.25

0.00

Output
Amplitude

1

0

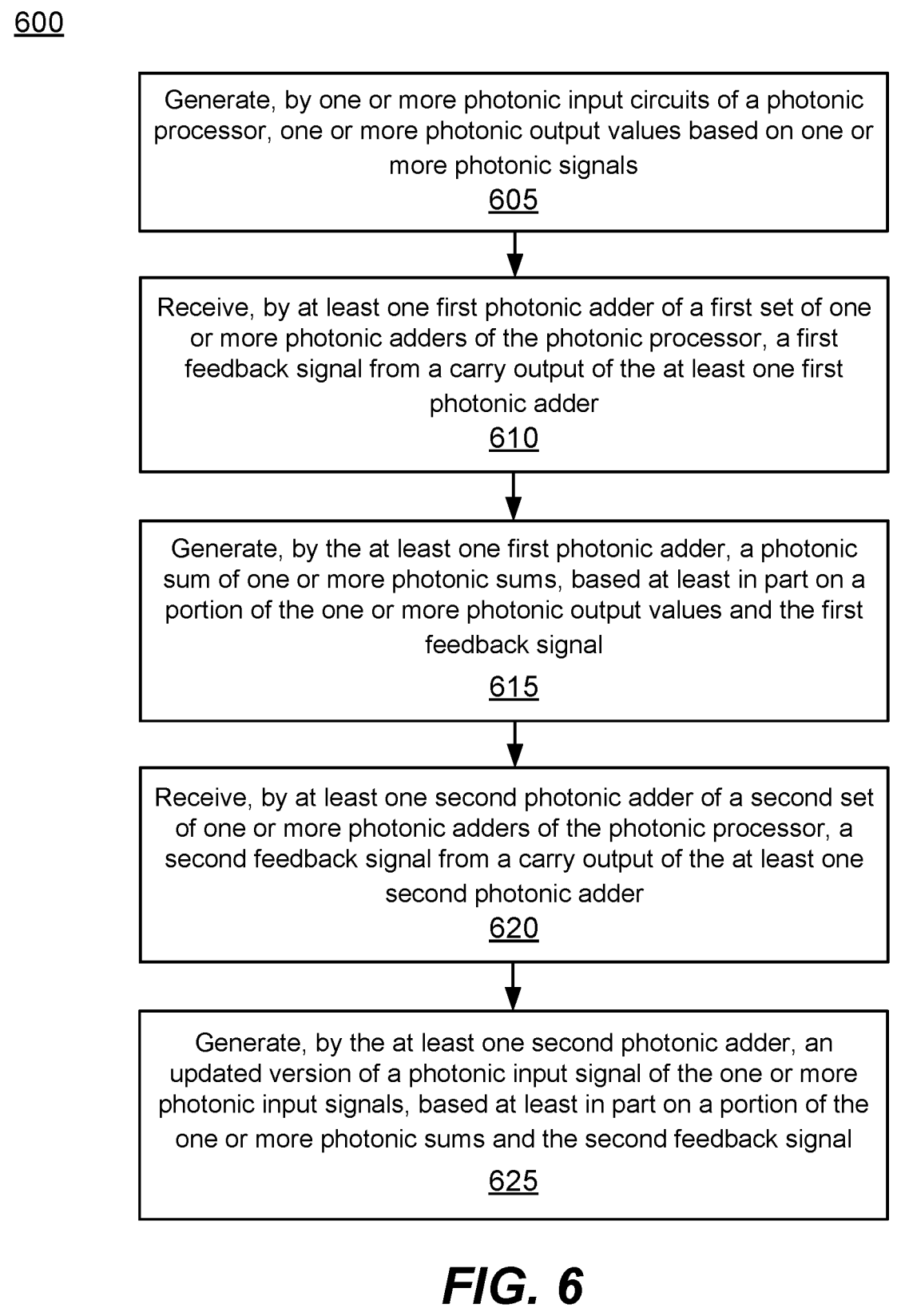

600

Generate, by one or more photonic input circuits of a photonic processor, one or more photonic output values based on one or more photonic signals
605

Receive, by at least one first photonic adder of a first set of one or more photonic adders of the photonic processor, a first feedback signal from a carry output of the at least one first photonic adder
610

Generate, by the at least one first photonic adder, a photonic sum of one or more photonic sums, based at least in part on a portion of the one or more photonic output values and the first feedback signal
615

Receive, by at least one second photonic adder of a second set of one or more photonic adders of the photonic processor, a second feedback signal from a carry output of the at least one second photonic adder
620

Generate, by the at least one second photonic adder, an updated version of a photonic input signal of the one or more photonic input signals, based at least in part on a portion of the one or more photonic sums and the second feedback signal
625

*FIG. 6*

PHOTONIC PROCESSOR WITH MULTIPLE LAYERS OF FEEDBACK FOR DIGITAL CURRENCY TRANSACTIONS

TECHNICAL FIELD

The present disclosure generally relates to a processor architecture, and more specifically to a photonic processor with multiple layers of feedback for, e.g., digital currency transactions.

BACKGROUND

Computation of hashes may be highly compute-intensive using large amounts of processing resources and energy. For example, bitcoin mining is a process that verifies the legitimacy of bitcoin transactions. In bitcoin mining, the SHA (Secure Hash Algorithm)-256 algorithm is used to process blocks of bitcoin transactions and reward mining entities with bitcoins. The SHA-256 algorithm is a highly secure cryptographic protocol with deterministic features. The SHA-256 is used to generate hashes that verify the legitimacy of blocks of transactions. Under certain circumstances, the number of hashes that must be computed to find a hash that will verify a set of bitcoin transactions can increase. Currently, many hashes per second must be generated to validate bitcoin transactions. The compute power required to generate the hashes per unit time (i.e., hash rate) has resulted in extremely large power consumption and a staggering carbon footprint.

SUMMARY

Embodiments of the present disclosure are directed to a photonic processor with multiple layers of feedback. The photonic processor presented herein can be utilized for efficient digital currency transactions (e.g., bitcoin mining), cryptographic algorithms (e.g., hash algorithms), or some other high-speed operations that involve photonic signals (i.e., light signals). The photonic processor includes one or more photonic input circuits, a first set of one or more photonic adders coupled to one or more photonic input circuits, and a second set of one or more photonic adders coupled to the first set of one or more photonic adders. The one or more photonic input circuits are configured to receive one or more photonic input signals and generate one or more photonic output values based on the one or more photonic input signals. At least one first photonic adder of the first set of one or more photonic adders includes a first feedback path configured to feed a first feedback signal from a first carry output of the at least one first photonic adder to an input of the at least one first photonic adder. The at least one first photonic adder is configured to generate a photonic sum of one or more photonic sums based at least in part on a portion of the one or more photonic output values and the first feedback signal. The at least one second photonic adder includes a second feedback path configured to feed a second feedback signal from a second carry output of the at least one second photonic adder to an input of the at least one second photonic adder. The at least one second photonic adder is configured to generate an updated version of a photonic input signal of the one or more photonic input signals based at least in part on a portion of the one or more photonic sums and the second feedback signal.

Embodiments of the present disclosure are further directed to a non-transitory computer-readable storage medium comprising stored thereon executable instructions that, when executed by at least one processor, cause the at least one processor to: instruct one or more photonic input circuits of a photonic processor to generate one or more photonic output values based on one or more photonic input signals; instruct at least one first photonic adder of a first set of one or more photonic adders of the photonic processor to receive a first feedback signal from a first carry output of the at least one second photonic adder of the first set of one or more photonic adders, and generate a photonic sum of one or more photonic sums, based at least in part on a portion of the one or more photonic output values and the first feedback signal; and instruct at least one second photonic adder of a second set of one or more photonic adders of the photonic processor to receive a second feedback signal from a second carry output of the at least one second photonic adder, and generate an updated version of a photonic input signal of the one or more photonic input signals, based at least in part on a portion of the one or more photonic sums and the second feedback signal. The non-transitory computer-readable storage medium can be a digital storage medium, an analog storage medium, an optical storage medium, some other type of storage medium, or some combination thereof. The at least one processor can be an optical processor, an electronic processor (e.g., central processing unit (CPU) processor, machine-learning (ML) processor, graphics processing unit (GPU) processor), some other type of processor, or some combination thereof.

Embodiments of the present disclosure are further directed to a method for operating a photonic processor with multiple layers of feedback. The method comprises: generating, by one or more photonic input circuits of the photonic processor, one or more photonic output values based on one or more photonic input signals; receiving, by at least one first photonic adder of a first set of one or more photonic adders of the photonic processor, a first feedback signal from a first carry output of the at least one first photonic adder; generating, by the at least one first photonic adder, a photonic sum of one or more photonic sums, based at least in part on a portion of the one or more photonic output values and the first feedback signal; receiving, by at least one second photonic adder of a second set of one or more photonic adders of the photonic processor, a second feedback signal from a second carry output of the at least one second photonic adder; and generating, by the at least one second photonic adder, an updated version of a photonic input signal of the one or more photonic input signals, based at least in part on a portion of the one or more photonic sums and the second feedback signal.

BRIEF DESCRIPTION OF THE DRAWINGS

Figure (FIG. 1 illustrates an example photonic processor with multiple layers of feedback, in accordance with some embodiments.

FIG. 6 is a flowchart illustrating an example method for operating a photonic processor with multiple layers of feedback, in accordance with some embodiments.

Figure 1:
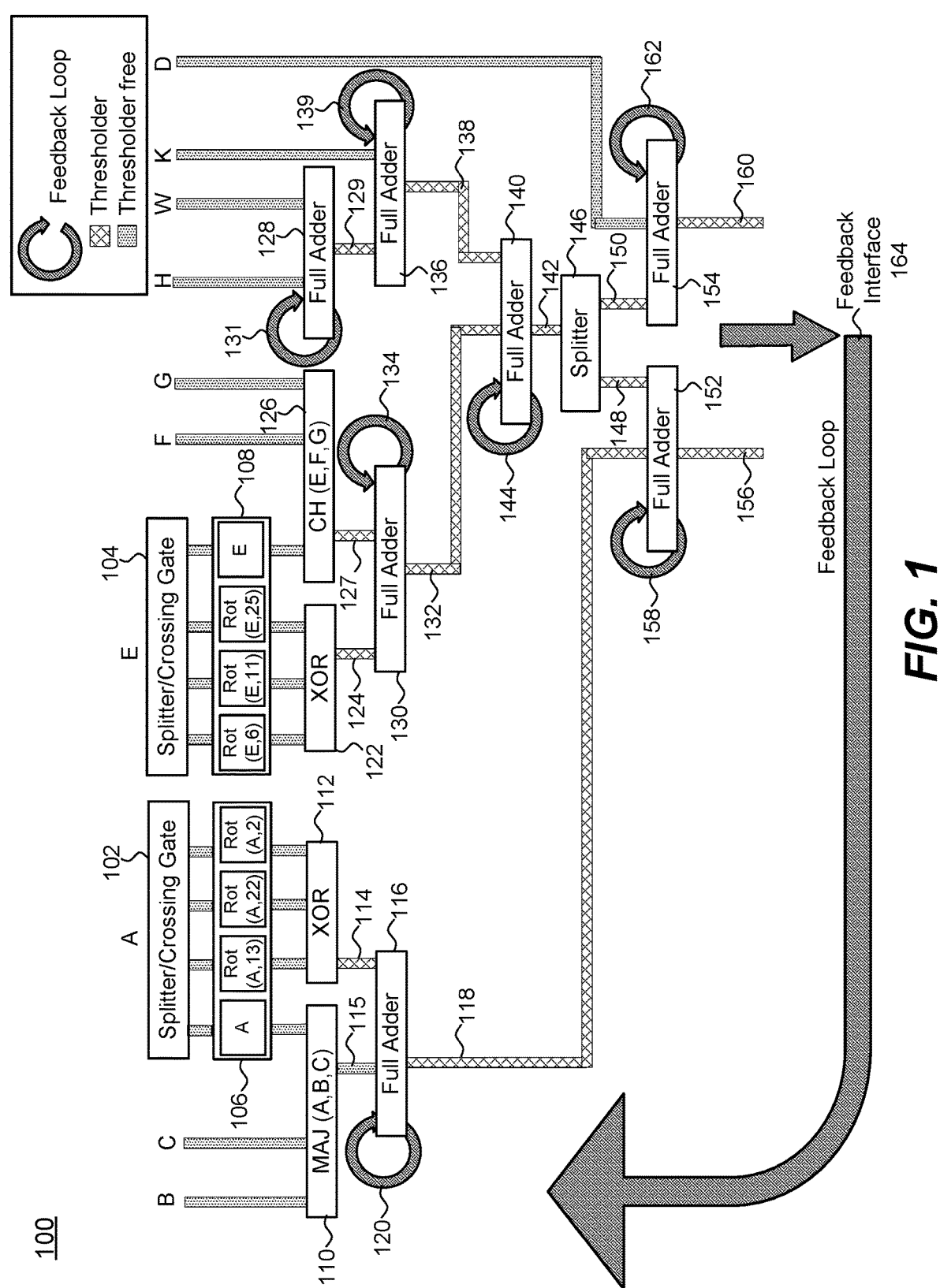

The figures depict embodiments of the present disclosure for purposes of illustration only. One skilled in the art will readily recognize from the following description that alternative embodiments of the structures and methods illustrated herein can be employed without departing from the principles or benefits touted by the disclosure described herein.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that can be employed without departing from the principles of what is claimed.

Reference will now be made in detail to several embodiments, examples of which are illustrated in the accompanying figures. It is noted that wherever practicable, similar or like reference numbers can be used in the figures and can indicate similar or like functionality. The figures depict embodiments of the disclosed system (or method) for illustration only. One skilled in the art will readily recognize from the following description that alternative embodiments of the structures and methods illustrated herein can be employed without departing from the principles described herein.

Embodiments of the present disclosure are directed to a hardware architecture implemented using photonic circuits that can significantly increase the energy efficiency (e.g., hashes per Watt) while simultaneously increasing a data rate (e.g., rate of hash generation) and decreasing a die area, i.e., increasing the compute density (e.g., hashes per mm²). This is achieved by implementing a secure hash algorithm (SHA, e.g., SHA-256) or some other algorithm (e.g., machine-learning algorithm) "all-optically"-using pulses of light or continuous-wave (CW) light sources implemented on a silicon photonics platform while employing multiple layers of feedback. A high throughput in the disclosed photonic architecture can be achieved by exploiting a high bandwidth, high switching speed, and low latency offered by optical interconnects, photonic devices, passive photonic logic gates, time-division multiplexing techniques, and wavelength-division multiplexing techniques. Additionally or alternatively, the mode-division multiplexing techniques may be utilized. Note that these elements and techniques can also contribute to high throughputs in central processing unit (CPU) processors, machine-learning (ML) processors, graphics processing unit (GPU) processors, and/or more general photonic information processors that require binary logic.

The small footprint (and hence high compute density) and low power consumption may be enabled by implementing all-optical logic with passive devices (e.g., photonic crystals or inverse-designed gates), and three-dimensional waveguides designed on silicon based or silicon nitride based dual layer wafers. Note that these elements and techniques can also contribute to high throughputs in CPU processors, ML processors, GPU processors and/or more general photonic information processors that require binary logic. The disclosed photonic architecture does not require any memory to store data and thus overcomes the need of data convertors (e.g., analog-to-digital convertors (ADCs) or digital-to analog convertors (DACs)) that have traditionally been a bottleneck for optical information processing. The design of photonic architecture presented herein is enabled by advances in foundry-compatible silicon photonics that has recently progressed to the level of sophistication required for large-scale integration. Silicon photonics leverages scaling advancements and technology leaps in complementary metal-oxide-semiconductor (CMOS) monolithic integration, flip-chip heterogeneous integration, or direct wire-bonding, driven by commercial sector progress.

The photonic architecture presented herein provides solutions to several challenging requirements. For example, the requirement for low-latency processing is fulfilled herein by the implementation of hash algorithm (or some other algorithm, such as ML algorithm) all-optically while utilizing passive linear and nonlinear photonic logic with small area (e.g., photonic crystals and inverse-designed gates). The requirement for high-bandwidth and throughput processing is fulfilled herein by implementing the SHA-256 algorithm all-optically while utilizing wavelength-division and time-division multiplexing techniques. Additionally, the use of digital memory and hence the use of data convertors (e.g., DACs and ADCs) is avoided. The requirement for low static and dynamic power consumption is fulfilled herein by utilizing passive linear and nonlinear photonic logic, low-power active photonic logic (e.g., optical thresholders) and optical interconnects (waveguides).

The requirement of low chip/die area for high processing throughput (i.e., high compute density, and large number of operations per second per unit area) is fulfilled herein by utilizing wavelength-division and time-division multiplexing, three-dimensional waveguides (e.g., designed on silicon based or silicon nitride based dual layer wafers), and small area passive linear and nonlinear photonic components. Additionally or alternatively, the mode-division multiplexing techniques may be utilized. Note that these elements and techniques can also contribute to high throughputs in CPU processors, ML processors, GPU processors and/or more general photonic information processors that require binary logic. Photonic computing is inherently analog; however, SHA algorithms require digital processing. This requirement is fulfilled herein by utilizing purely photonic digital logic to overcome the need to use data convertors. The requirement for low-loss information processing is fulfilled herein by utilizing low-loss optical interconnects (e.g., silicon or silicon nitride interconnects), passive photonic logic, and nonlinear optical thresholders. The requirement for increased processing throughput is fulfilled herein by utilizing high-speed photonic inputs and high-speed clock (without utilizing memory and data convertors), thus enabling computation of more hashes per unit of information.

A photonic processor presented herein utilizes multiple layers of feedback (e.g., 32-bit feedback loops). One layer of feedback can be applied at carry signals of full photonic adders of the photonic processor, and another layer of feedback can be applied at an output of each processing iteration of the photonic processor. The photonic processor with multiple layers of feedback achieves faster input data rate and faster repetition rate, while utilizing fewer photonic components. The photonic processor presented herein further includes optical thresholders for correction of phase errors and/or amplitude errors, thus allowing cascading "all-optical" interconnections of photonic gates within the photonic processor. In one or more embodiments, the optical thresholders are implemented as passive nonlinear photonic thresholders (e.g., resonator-based thresholding devices). In one or more other embodiments, the optical thresholders are implemented as active or passive nonlinear optical saturable absorbers that absorb incoming light with amplitudes above a threshold level and output light having a sequence of thresholded amplitudes. In one or more other embodiments, the optical thresholders are implemented as active nonlinear semiconductor optical amplifier (SOA) based amplitude thresholders. In some other embodiments, the optical thresholders are implemented as some other photonic thresholding devices. The optical thresholders are included within photonic gates of the photonic processor, thus representing building blocks for nonlinear photonic gates (e.g., nonlinear exclusive 'OR' (XOR) photonic gates) of the photonic processor.

Photonic Processor with Multiple Layers of Feedback

Figure (FIG. 1 illustrates an example photonic processor 100 with multiple layers of feedback, in accordance with some embodiments. The photonic processor 100 may include photonic splitter/crossing gates 102 and 104, photonic circuits 106 and 108, a photonic majority logic gate 110, photonic XOR gates 112 and 122, a photonic choose logic gate 126, photonic full adders 116, 128, 130, 136, 140, 152, 154, and a photonic splitter 146. The photonic processor 100 may include fewer or additional components not shown in FIG. 1. The photonic processor 100 may be configured for execution of, e.g., the SHA-256 algorithm or some other SHA-based algorithm. Alternatively or additionally, the photonic processor 100 may be suitable for execution of an ML algorithm or some other algorithm with high data rate requirements. The photonic processor 100 may be configured for supporting data rates of up to several terabits per second.

The photonic processor 100 may receive one or more input messages, W, and initial key values, A, B, C, D, E, F, G and H. The input messages and the initial key values may be photonic signals (i.e., light signals) of specific wavelengths generated by, e.g., an array of pulse lasers (not shown in FIG. 1). The array of lasers may generate the input messages and the initial key values based on electrical (i.e., digital) input data obtained from, e.g., a block header received at the photonic processor 100 from a digital network. The input data may include digital values (i.e., time series of amplitudes representing bit sequences) associated with the input messages and the initial key values. Each input message, W, may be a photonic signal of a respective wavelength that corresponds to, e.g., a 32-bit sequence. A total number of, e.g., 16 input messages each represented with a different wavelength may be input to the photonic processor 100. Each initial key value, A, B, C, D, E, F, G and H, may be a photonic signal that corresponds to, e.g., a 32-bit sequence.

The initial key value A may be passed onto the photonic splitter/crossing gate 102. The photonic splitter/crossing gate 102 may split (or cross-connect) the initial key value A into, e.g., four photonic signals that are passed onto the photonic circuit 106. The photonic circuit 106 may include a photonic register that stores the initial key value A, a first photonic rotator circuit that performs a right rotation of the initial key value A by 13 bit-positions (i.e., Rot (A, 13)), a second photonic rotator circuit that performs a right rotation of the initial key value A by 22 bit-positions (i.e., Rot (A, 22)), and a third photonic rotator circuit that performs a right rotation of the initial key value A by 2 bit-positions (i.e., Rot (A, 2)). The photonic circuit 106 may pass the initial key value A to the photonic majority logic gate 110. Additionally, the photonic circuit 106 may pass the rotated initial key values Rot (A, 13), Rot (A, 22) and Rot (A, 2) to the XOR photonic gate 112. Note that the photonic splitter/crossing gate 102 and the photonic circuit 106 are passive linear photonic circuits that do not require any nonlinear photonic components (e.g., nonlinear optical thresholders).

The XOR photonic gate 112 is a nonlinear photonic gate that performs the XOR logical operation between the rotated initial key values Rot (A, 13), Rot (A, 22) and Rot (A, 2) to generate a photonic signal 114 that can be referred to as, $\Sigma_0(A)$, where $\Sigma_0(A)=\mathrm{Rot}(A, 2)\oplus\mathrm{Rot}(A, 13)\oplus\mathrm{Rot}(A, 22)$. The XOR photonic gate 112 may include a nonlinear optical thresholder for correcting errors (e.g., amplitude errors and/or phase errors) in photonic signals generated within the XOR photonic gate 112. The XOR photonic gate 112 may pass the photonic signal 114, $\Sigma_0(A)$, to the photonic full adder 116. More details about an operation and design of the nonlinear XOR photonic gate 112 are provided in relation to FIG. 2.

In addition to the initial key value A, the initial key values B and C may be passed onto the photonic majority logic gate 110. The photonic majority logic gate 110 may generate a photonic signal 115 that represents a majority function (e.g., MAJ (A, B, C)) of the received initial key values A, B and C, where MAJ (A, B, C)=$(A\vee B)\wedge(A\vee C)\wedge(B\vee C)$. Note that the photonic majority logic gate 110 is a passive linear photonic gate that does not require any nonlinear photonic component (e.g., nonlinear optical thresholder). The photonic majority logic gate 110 may pass the photonic signal 115, MAJ (A, B, C), to the photonic full adder 116.

The photonic full adder 116 may add the photonic signal 114, $\Sigma_0(A)$, to the photonic signal 115, MAJ (A, B, C), to generate a photonic signal 118, which can be referred to as $T_2=\Sigma_0(A)+\mathrm{MAJ}(A, B, C)$. The photonic full adder 116 may be configured as a 32-bit photonic full adder, i.e., each photonic signal 114, 115 input to the photonic full adder 116 may represent a 32-bit sequence, and the photonic signal 118 output by the photonic full adder 116 may represent a 32-bit sequence. Additionally, the photonic full adder 116 may generate a photonic carry signal (e.g., photonic carry-out signal) that is fed back, via a feedback path 120, as an additional input to the photonic full adder 116 (e.g., photonic carry-in signal). The photonic carry signal that is fed back via the feedback path 120 may represent, e.g., a 32-bit sequence. Note that the photonic full adder 116 may include a plurality of nonlinear XOR photonic gates each employing a nonlinear optical thresholder for correction of amplitude errors and/or phase errors within the photonic full adder 116. The photonic full adder 116 may pass the photonic signal 118, $T_2$, to the photonic full adder 152.

The initial key value E may be passed onto the photonic splitter/crossing gate 104. The photonic splitter/crossing gate 104 may split the initial key value E into, e.g., four photonic signals that are passed onto the photonic circuit 108. The photonic circuit 108 may include a photonic register that stores the initial key value E, a first photonic rotator circuit that performs a right rotation of the initial key value E by 25 bit-positions (i.e., Rot (E, 25)), a second photonic rotator circuit that performs a right rotation of the initial key value E by 11 bit-positions (i.e., Rot (E, 11)), and a third photonic rotator circuit that performs a right rotation of the initial key value E by 6 bit-positions (i.e., Rot (E, 6)). The photonic circuit 108 may pass the initial key value E to the photonic choose logic gate 126. Additionally, the photonic circuit 108 may pass the rotated initial key values Rot (E, 25), Rot (E, 11) and Rot (E, 6) to an XOR photonic gate 122. Note that the photonic splitter/crossing gate 104 and the photonic circuit 108 are passive linear photonic circuits that do not require any nonlinear photonic components (e.g., nonlinear optical thresholders).

The XOR photonic gate 122 may be a nonlinear photonic gate that performs the XOR logical operation between the rotated initial key values Rot (E, 25), Rot (E, 11) and Rot (E, 6) to generate a photonic signal 124 that can be referred to as, $\Sigma_1(E)$, where $\Sigma_1(E)=\text{Rot}(E, 6)\oplus\text{Rot}(E, 11)\oplus\text{Rot}(E, 25)$. The XOR photonic gate 122 may include a nonlinear optical thresholder for correcting errors (e.g., amplitude errors and/ or phase errors) in photonic signals generated within the XOR photonic gate 122. The XOR photonic gate 122 may pass the photonic signal 124, $\Sigma_1(E)$, to the photonic full adder 130. The XOR photonic gate 122 may have the same structure as the XOR photonic gate 112. More details about an operation and design of the nonlinear XOR photonic gate 122 are provided in relation to FIG. 2.

In addition to the initial key value E, the initial key values F and G may be passed onto the photonic choose logic gate 126. The photonic choose logic gate 126 may generate a photonic signal 127 that represents a choose function (e.g., CH (E, F, G)) of the received initial key values E, F and G, where $CH(E, F, G)=(E\vee F)\wedge(\neg E\vee G)$. Note that the photonic choose logic gate 126 is a passive linear photonic gate that does not require any nonlinear photonic component (e.g., nonlinear optical thresholder). The photonic choose logic gate 126 may pass the photonic signal 127, CH (E, F, G), to the photonic full adder 130.

The photonic full adder 130 may add the photonic signal 124, $\Sigma_1(E)$, to the photonic signal 127, CH (E, F, G), to generate a photonic signal 132, which corresponds to $\Sigma_1(E)+$ CH(E, F, G). The photonic full adder 130 may be configured as a 32-bit photonic full adder, i.e., each photonic signal 124, 127 input to the photonic full adder 130 may represent a 32-bit sequence, and the photonic signal 132 output by the photonic full adder 130 may represent a 32-bit sequence. Additionally, the photonic full adder 130 may generate a photonic carry signal (e.g., photonic carry-out signal) that is fed, via a feedback path 134, back as an additional input to the photonic full adder 130 (e.g., photonic carry-in signal). The photonic carry signal that is fed back via the feedback path 134 may represent, e.g., a 32-bit sequence. Note that the photonic full adder 130 may include a plurality of nonlinear XOR photonic gates each employing a nonlinear optical thresholder for correction of amplitude errors and/or phase errors within the photonic full adder 130. The photonic full adder 130 may pass the photonic signal 132, $\Sigma_1(E)+CH(E, F, G)$, to the photonic full adder 140.

The photonic full adder 128 may add the initial key value H to the input message W to generate a photonic signal 129, which corresponds to H+W. The photonic full adder 128 may be configured as a 32-bit photonic full adder, i.e., each photonic signal H and W input to the photonic full adder 128 may represent a 32-bit sequence, and the photonic signal 129 output by the photonic full adder 128 may represent a 32-bit sequence. Additionally, the photonic full adder 128 may generate a photonic carry signal (e.g., photonic carry-out signal) that is fed back, via a feedback path 131, as an additional input to the photonic full adder 128 (e.g., photonic carry-in signal). The photonic carry signal that is fed back via the feedback path 131 may represent, e.g., a 32-bit sequence. Note that the photonic full adder 128 may include a plurality of nonlinear XOR photonic gates each employing a nonlinear optical thresholder for correction of amplitude errors and/or phase errors within the photonic full adder 128.

The photonic full adder 128 may pass the photonic signal 129, H+W, to the photonic full adder 136.

The photonic full adder 136 may add the photonic signal 129 to the initial key K to generate a photonic signal 138, which corresponds to H+W+K. The photonic full adder 136 may be configured as a 32-bit photonic full adder, i.e., the photonic signal 129 and the initial key K input to the photonic full adder 136 may each represent a 32-bit sequence, and the photonic signal 138 output by the photonic full adder 138 may represent a 32-bit sequence. Additionally, the photonic full adder 136 may generate a photonic carry signal (e.g., photonic carry-out signal) that is fed back, via a feedback path 139, as an additional input to the photonic full adder 136 (e.g., photonic carry-in signal). The photonic carry signal that is fed back via the feedback path 139 may represent, e.g., a 32-bit sequence. Note that the photonic full adder 136 may include a plurality of nonlinear XOR photonic gates each employing a nonlinear optical thresholder for correction of amplitude errors and/or phase errors within the photonic full adder 136. The photonic full adder 136 may pass the photonic signal 138, H+W+K, to the photonic full adder 140.

The photonic full adder 140 may add the photonic signal 132, $\Sigma_1(E)+CH(E, F, G)$, to the photonic signal 138, H+W+ K, to generate a photonic signal 142, which can be referred to as $T_1=H+\Sigma_1(E)+CH(E, F, G)+W+K$. The photonic full adder 140 may be configured as a 32-bit photonic full adder, i.e., each of the photonic signals 132 and 138 input to the photonic full adder 140 may represent a 32-bit sequence, and the photonic signal 142 output by the photonic full adder 140 may represent a 32-bit sequence. Additionally, the photonic full adder 140 may generate a photonic carry signal (e.g., photonic carry-out signal) that is fed back, via a feedback path 144, as an additional input to the photonic full adder 140 (e.g., photonic carry-in signal). The photonic carry signal that is fed back via the feedback path 144 may represent, e.g., a 32-bit sequence. Note that the photonic full adder 140 may include a plurality of nonlinear XOR photonic gates each employing a nonlinear optical thresholder for correction of amplitude errors and/or phase errors within the photonic full adder 140. The photonic full adder 140 may pass the photonic signal 142, $T_1$, to the splitter 146.

The splitter 146 may operate as a photonic beam splitter that splits the photonic signal 142, $T_1$, into a photonic signal 148 and a photonic signal 150. Each of the photonic signals 148, 150 may represent a copy of the photonic signal 142, $T_1$. The splitter 146 may pass the photonic signal 148, $T_1$, onto the photonic full adder 152. Additionally, the splitter 146 may pass the photonic signal 150, $T_1$, onto the photonic full adder 154. Note that the splitter 146 may be an active (i.e., nonlinear) photonic circuit that includes at least one nonlinear optical thresholder.

The photonic full adder 152 may add the photonic signal 118, $T_2$, to the photonic signal 148, $T_1$, to generate a photonic output signal 156, which represents an updated value of the key A, $A=T_1+T_2$. The photonic full adder 152 may be configured as a 32-bit photonic full adder, i.e., each of the photonic signals 118 and 148 input to the photonic full adder 152 may represent a 32-bit sequence, and the photonic signal 156 output by the photonic full adder 152 may represent a 32-bit sequence. Additionally, the photonic full adder 152 may generate a photonic carry signal (e.g., photonic carry-out signal) that is fed back, via a feedback path 158, as an additional input to the photonic full adder 152 (e.g., photonic carry-in signal). The photonic carry signal that is fed back via the feedback path 158 may represent, e.g., a 32-bit sequence. Note that the photonic full adder 152 may include a plurality of nonlinear XOR photonic gates each employing a nonlinear optical thresholder for correction of amplitude errors and/or phase errors within the photonic full adder 152.

The photonic full adder 154 may add the photonic signal 150, $T_1$, to the initial key D, to generate a photonic output signal 160, which represents an updated value of the key E, $E=T_1+D$. The photonic full adder 154 may be configured as a 32-bit photonic full adder, i.e., each of the photonic signals $T_1$ and D input to the photonic full adder 154 may represent a 32-bit sequence, and the photonic signal 160 output by the photonic full adder 154 may represent a 32-bit sequence. Additionally, the photonic full adder 154 may generate a photonic carry signal (e.g., photonic carry-out signal) that is fed back, via a feedback path 162, as an additional input to the photonic full adder 154 (e.g., photonic carry-in signal). The photonic carry signal that is fed back via the feedback path 162 may represent, e.g., a 32-bit sequence. Note that the photonic full adder 154 may include a plurality of nonlinear XOR photonic gates each employing a nonlinear optical thresholder for correction of amplitude errors and/or phase errors within the photonic full adder 154.

The photonic output signals 156 and 160 representing updating values of the keys A and E may be fed back, via a feedback interface 164 (e.g., feedback path), to corresponding photonic inputs of the photonic splitters/crossing gates 102, 104. In this manner, the keys A and E are updated. For remaining keys B, C, D, F, G and H to be updated, additional connections may be implemented within the photonic processor 100 so that, at a start of a new iteration of the algorithm (e.g., SHA algorithm, ML algorithm, or some other algorithm), the following keys updates would occur: B=A, C=B, D=C, F=E, G=F, and H=G. Furthermore, one or more new input messages W may be passed onto the photonic full adder 128. After that, the new iteration of the algorithm is performed by the photonic processor 100 using the updated keys and the one or more new input messages W. After a defined number of iterations (e.g., 64 iterations), the photonic processor 100 may output photonic output signals 156 and 160 representing, e.g., portions of a hash value. By employing multiple layers of feedback (i.e., across each photonic full adder and across an entire photonic processor 100), the photonic processor 100 employs a fewer number of photonic components compared to a photonic processor that does not employ multiple layers of feedback. This leads to a smaller die area of the photonic processor 100 compared to non-feedback type photonic processors, while the photonic processor 100 preserves the support of high processing data rates.

Example Photonic Full Adder

Figure 2:
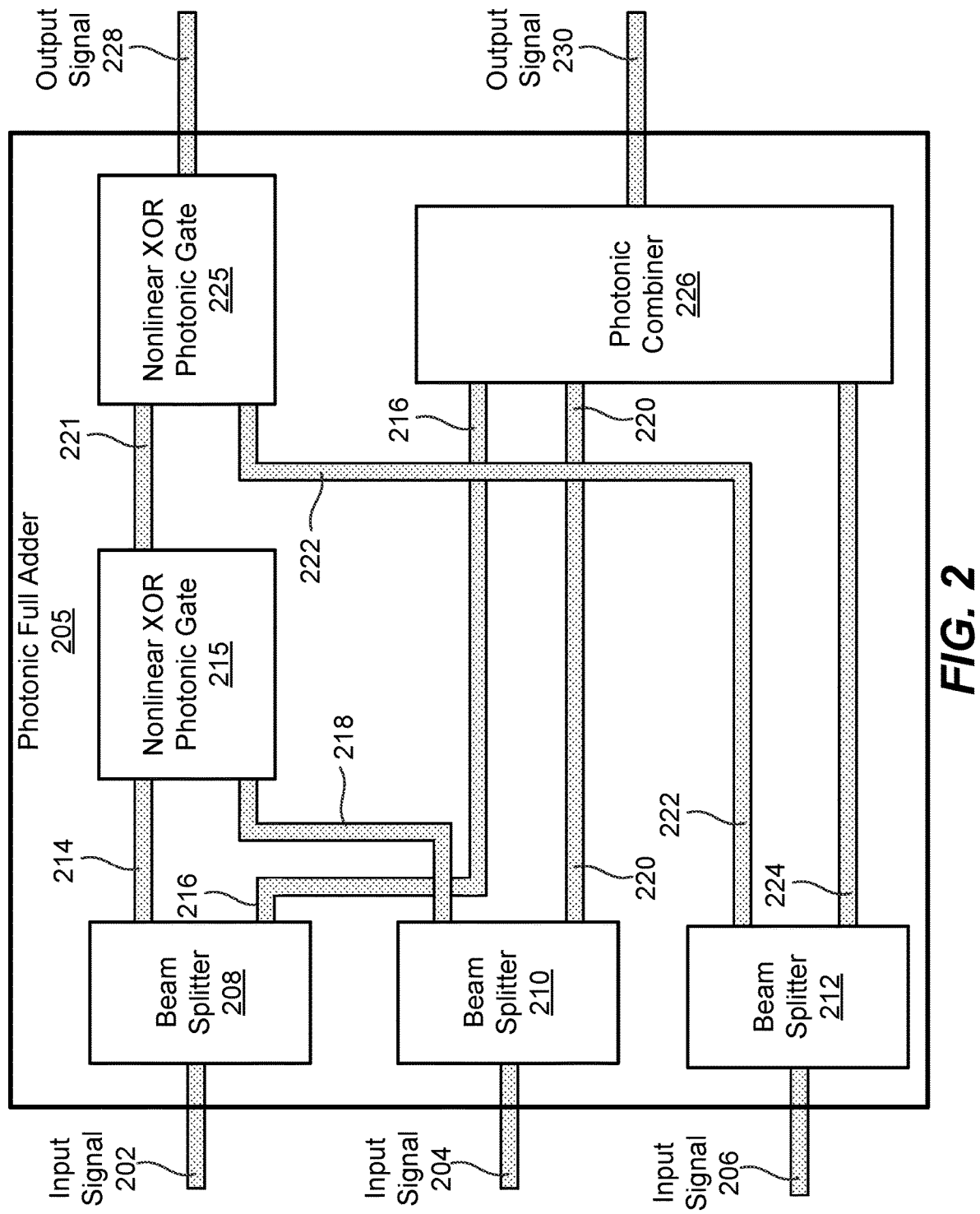
FIG. 2 illustrates an example photonic full adder used in the photonic processor of FIG. 1, in accordance with some embodiments.

FIG. 2 illustrates an example photonic full adder 205 used in the photonic processor 100, in accordance with some embodiments. The photonic full adder 205 may be an embodiment of any of the photonic full adders 116, 128, 130, 136, 140, 152 and 154. The photonic full adder 205 may support operations on photonic signals having repetition rates of up to several terabits per second and clock periods of up to hundreds of femtoseconds.

The photonic full adder 205 may include beam splitters 208, 210, 212, a non-linear XOR photonic gate 215 connected to a first output port of the beam splitter 208 and a first output port of the beam splitter 210, a non-linear XOR photonic gate 225 connected to an output port of the non-linear XOR photonic gate 215 and a first output port of the beam splitter 212, and a photonic combiner 226 coupled to second output ports of the beam splitters 208, 210, 212. The photonic full adder 205 may generate a photonic output signal 228 as a logical sum of input signals 202, 204 and 206, as well as a photonic output signal 230 that represents a photonic carry-out signal of the photonic full adder 205. The photonic full adder 205 may include fewer or additional components not shown in FIG. 2, such as, but not limited to, phase shifters for compensation of fabrication variations, linear photonic amplifiers, and/or photonic attenuators.

The beam splitter 208 may receive the photonic input signal 202 at its input port. The photonic input signal 202 may be a light signal of corresponding input amplitudes (that each corresponds to logical "1" or logical "0"), corresponding input phases and/or corresponding input modes (i.e., input light spatial distribution and/or input wavelengths) injected into the input port of the beam splitter 208. The photonic input signal 202 may be generated by one or more lasers coupled to the input port of the beam splitter 208 (not shown in FIG. 2). The one or more lasers may be instructed (i.e., triggered) by at least one processor (e.g., optical processor, electronic processor, electro-optical processor, etc.) coupled to the one or more lasers to generate the photonic input signal 202 of specific amplitudes, phases and/or modes (or wavelengths). The input port of the beam splitter 208 may represent, e.g., a waveguide, a waveguide polarization, a waveguide mode, a light wavelength, etc. The input port of the beam splitter 208 may be a first input port of the photonic full adder 205. The beam splitter 208 is a linear photonic component that splits the received photonic input signal 202 into two photonic signals 214, 216. Each photonic signal 214, 216 may be output at a respective output port of the beam splitter 208. A set of output ports of the beam splitter 208 may represent, e.g., a set of waveguides, a set of waveguide polarizations, a set of waveguide modes, a set of light wavelengths, signals radiated by the beam splitter 208, etc. The photonic signals 214 and 216 generated by the beam splitter 208 may be passed to the nonlinear XOR photonic gate 215 and the photonic combiner 226, respectively.

The beam splitter 210 may receive the photonic input signal 204 at its input port. The photonic input signal 204 may be a light signal of corresponding input amplitudes (that each corresponds to logical "1" or logical "0"), corresponding input phases and/or corresponding input modes (i.e., input light spatial distribution and/or input wavelengths) injected into the input port of the beam splitter 210. The photonic input signal 204 may be generated by one or more lasers coupled to the input port of the beam splitter 210 (not shown in FIG. 2). The one or more lasers may be instructed (i.e., triggered) by at least one processor (e.g., optical processor, electronic processor, electro-optical processor, etc.) coupled to the one or more lasers to generate the photonic input signal 204 of specific amplitudes, phases and/or modes (or wavelengths). The input port of the beam splitter 210 may represent, e.g., a waveguide, a waveguide polarization, a waveguide mode, a light wavelength, etc. The input port of the beam splitter 210 may be a second input port of the photonic full adder 205. The beam splitter 210 is a linear photonic component that splits the received photonic input signal 204 into two photonic signals 218, 220. Each photonic signal 218, 220 may be output at a respective output port of the beam splitter 210. A set of output ports of the beam splitter 210 may represent, e.g., a set of waveguides, a set of waveguide polarizations, a set of waveguide modes, a set of light wavelengths, signals radiated by the beam splitter 210, etc. The photonic signals 218 and 220 generated by the beam splitter 210 may be passed to the nonlinear XOR photonic gate 215 and the photonic combiner 226, respectively.

The beam splitter 212 may receive the photonic input signal 206 at its input port. The photonic input signal 206 may represent a photonic carry-in signal of the photonic full adder 205. The photonic input signal 206 may be a light signal of corresponding input amplitudes (that each corresponds to logical "1" or logical "0"), corresponding input phases and/or corresponding input modes (i.e., input light spatial distribution and/or input wavelengths) injected into the input port of the beam splitter 212. The input port of the beam splitter 212 may represent, e.g., a waveguide, a waveguide polarization, a waveguide mode, a light wavelength, etc. The input port of the beam splitter 212 may be a third input port of the photonic full adder 205. The beam splitter 212 is a linear photonic component that splits the received photonic input signal 206 into two photonic signals 222, 224. Each photonic signal 222, 224 may be output at a respective output port of the beam splitter 212. A set of output ports of the beam splitter 212 may represent, e.g., a set of waveguides, a set of waveguide polarizations, a set of waveguide modes, a set of light wavelengths, signals radiated by the beam splitter 212, etc. The photonic signals 222 and 224 generated by the beam splitter 212 may be passed to the nonlinear XOR photonic gate 225 and the photonic combiner 226, respectively.

The nonlinear XOR photonic gate 215 may receive, at a set of input ports, the photonic signals 214, 218 and generate a photonic signal 221 as the XOR logical function of the received photonic signals 214 and 218. The nonlinear XOR photonic gate 215 may be also configured to perform one or more additional logical functions. The set of input ports of the nonlinear XOR photonic gate 215 may represent, e.g., a set of waveguides, a set of waveguide polarizations, a set of waveguide modes, a set of light wavelengths, etc. The photonic signal 221 may be a light signal of corresponding output amplitudes (that each corresponds to logical "1" or logical "0"), corresponding output phase and/or corresponding output mode (i.e., output light spatial distribution and/or output wavelength) detected at an output port of the nonlinear XOR photonic gate 215. The output port of the nonlinear XOR photonic gate 215 may represent, e.g., a waveguide, a waveguide polarization, a waveguide mode, a light wavelength, a signal radiated by the nonlinear XOR photonic gate 215, etc. The nonlinear XOR photonic gate 215 may pass the photonic signal 221 to the nonlinear XOR photonic gate 225. Details about a structure and operation of the nonlinear XOR photonic gate 215 are shown in relation to FIGS. 4A-4C.

The nonlinear XOR photonic gate 225 may receive, at a set of input ports, the photonic signals 221, 222 and generate the photonic output signal 228 as the XOR logical function of the received photonic signals 221 and 222. The nonlinear XOR photonic gate 225 may be also configured to perform one or more additional logical functions. The photonic output signal 228 may represent a logical sum of the input signals 202, 204 and 206 (e.g., a pair of logical inputs and carry-in). The set of input ports of the nonlinear XOR photonic gate 225 may represent, e.g., a set of waveguides, a set of waveguide polarizations, a set of waveguide modes, a set of light wavelengths, etc. The photonic output signal 228 may be a light signal of corresponding output amplitudes (that each corresponds to logical "1" or logical "0"), corresponding output phase and/or corresponding output mode (i.e., output light spatial distribution and/or output wavelength) detected at an output port of the nonlinear XOR photonic gate 225. The output port of the nonlinear XOR photonic gate 225 may represent, e.g., a waveguide, a waveguide polarization, a waveguide mode, a light wavelength, a signal radiated by the nonlinear XOR photonic gate 225, etc. The output port of the nonlinear XOR photonic gate 225 may be a first output port of the photonic full adder 205. Details about a structure and operation of the nonlinear XOR photonic gate 225 are shown in relation to FIGS. 4A-4C.

The photonic combiner 226 may receive, at a set of input ports, the photonic signals 216, 220, 224 and generate the photonic output signal 230 that represents a logical combination of the photonic signals 216, 220, 224. Thus, the photonic combiner 226 operates as a linear OR photonic logic gate. The photonic output signal 230 may represent a photonic carry-out signal of the photonic full adder 205. The set of input ports of the photonic combiner 226 may represent, e.g., a set of waveguides, a set of waveguide polarizations, a set of waveguide modes, a set of light wavelengths, etc. The photonic output signal 230 may be a light signal of corresponding output amplitudes (that each corresponds to logical "1" or logical "0"), corresponding output phase and/or corresponding output mode (i.e., output light spatial distribution and/or output wavelength) detected at an output port of the photonic combiner 226. The output port of the photonic combiner 226 may represent, e.g., a waveguide, a waveguide polarization, a waveguide mode, a light wavelength, a signal radiated by the photonic combiner 226, etc. The output port of the photonic combiner 226 may be a second output port of the photonic full adder 205. In some embodiments (e.g., for the phonic full adders of the photonic processor 100 in FIG. 1), the second output port of the photonic full adder 205 is directly connected to the third input port of the photonic full adder 205 so that the photonic carry-out signal (i.e., the photonic output signal 230) generated by the photonic full adder 205 is fed back as the photonic carry-in signal (i.e., the photonic input signal 206) for the next iteration of operation of the photonic full adder 205.

Example Nonlinear Photonic Gate

Figure 3:
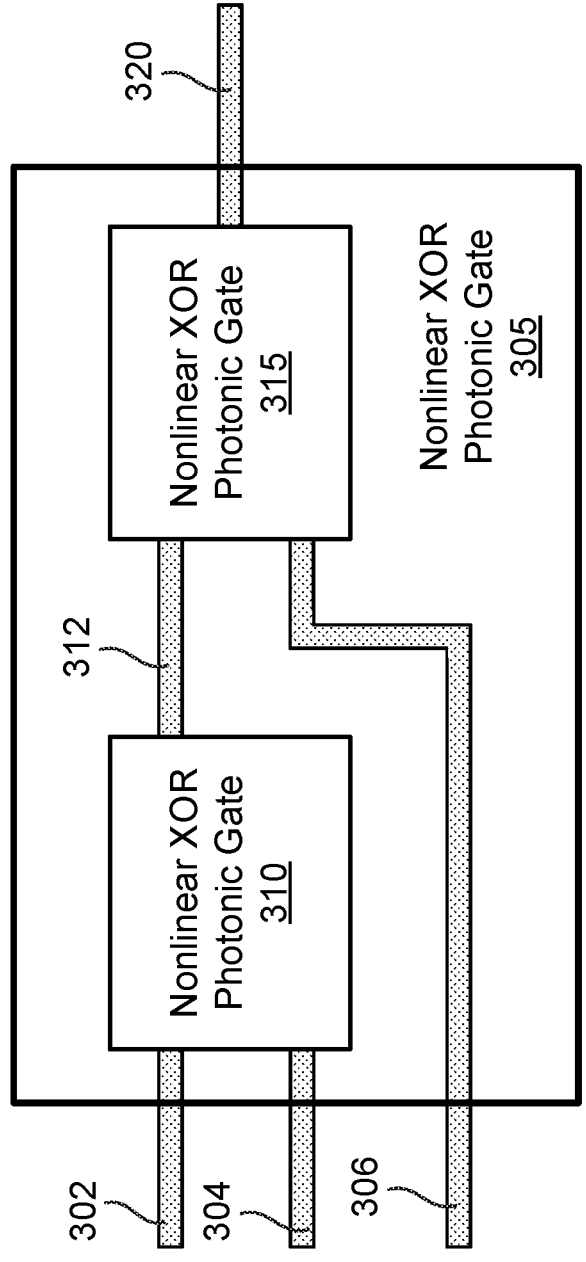
FIG. 3 illustrates an example three-input nonlinear exclusive 'OR' (XOR) photonic gate used in the photonic processor of FIG. 1, in accordance with some embodiments.

FIG. 3 illustrates an example three-input nonlinear XOR photonic gate 305 used in the photonic processor 100, in accordance with some embodiments. The nonlinear XOR photonic gate 305 may be an embodiment of the XOR photonic gates 112 and 122. Additionally, the nonlinear XOR photonic gate 305 may be utilized as part of the photonic full adders 116, 128, 130, 136, 140, 152, 154. The nonlinear XOR photonic gate 305 may support operations on photonic signals having repetition rates of up to several terabits per second and clock periods of up to hundreds of femtoseconds.

The three-input nonlinear XOR photonic gate 305 may include a two-input nonlinear XOR photonic gate 310 and a two-input nonlinear XOR photonic gate 315 connected to an output port of the two-input nonlinear XOR photonic gate 310, i.e., a cascading connection of a pair of the two-input nonlinear XOR photonic gates 310 and 315. The three-input nonlinear XOR photonic gate 305 may generate a photonic output signal 320 as the XOR logical function of photonic input signals 302, 304 and 306. The three-input nonlinear XOR photonic gate 305 may be configured to perform one or more additional logic functions. The three-input nonlinear XOR photonic gate 305 may include additional components not shown in FIG. 3, such as, but not limited to, phase shifters for compensation of fabrication variations, linear photonic amplifiers, and/or photonic attenuators.

The nonlinear XOR photonic gate 310 may receive, at a set of input ports, the photonic input signals 302, 304 and generate a photonic signal 312 as the XOR logical function of the received photonic input signals 302 and 304. The nonlinear XOR photonic gate 310 may be also configured to perform one or more additional logical functions. The photonic input signals 302, 304 may be light signals of corresponding input amplitudes (that each corresponds to logical "1" or logical "0"), corresponding input phases and/or corresponding input modes (i.e., input light spatial distribution and/or input wavelengths) injected into a set of input ports of the nonlinear XOR photonic gate 310. The photonic input signals 302, 304 may be generated by an array of lasers (not shown in FIG. 3). The array of lasers may be instructed (i.e., triggered) by at least one processor (e.g., optical processor, electronic processor, electro-optical processor, etc.) coupled to the array of lasers to generate the photonic input signals 302, 304 of specific amplitudes, phases and/or modes (or wavelengths). The set of input ports of the nonlinear XOR photonic gate 310 may represent, e.g., a set of waveguides, a set of waveguide polarizations, a set of waveguide modes, a set of light wavelengths, etc. The set of input ports of the nonlinear XOR photonic gate 310 may be first and second input ports of the three-input nonlinear XOR photonic gate 305. The photonic signal 312 may be a light signal of corresponding output amplitudes (that each corresponds to logical "1" or logical "0"), corresponding output phase and/or corresponding output mode (i.e., output light spatial distribution and/or output wavelength) detected at an output port of the nonlinear XOR photonic gate 310. The output port of the nonlinear XOR photonic gate 310 may represent, e.g., a waveguide, a waveguide polarization, a waveguide mode, a light wavelength, a signal radiated by the nonlinear XOR photonic gate 310, etc. The nonlinear XOR photonic gate 310 may pass the photonic signal 312 to the nonlinear XOR photonic gate 315. Details about a structure and operation of the nonlinear XOR photonic gate 310 are shown in relation to FIGS. 4A-4C.

The nonlinear XOR photonic gate 315 may receive, at a set of input ports, the photonic signal 312 generated by the nonlinear XOR photonic gate 315 and the photonic input signal 306. The nonlinear XOR photonic gate 315 may generate the photonic output signal 320 as the XOR logical function of the received photonic signals 312 and 306. The nonlinear XOR photonic gate 315 may be also configured to perform one or more additional logical functions. The photonic input signal 306 may be a light signal of corresponding input amplitudes (that each corresponds to logical "1" or logical "0"), corresponding input phases and/or corresponding input modes (i.e., input light spatial distribution and/or input wavelengths) injected into a second input port of the nonlinear XOR photonic gate 315. The photonic input signal 306 may be generated by one or more lasers coupled to the second input port of the nonlinear XOR photonic gate 315 (not shown in FIG. 3). The one or more lasers may be instructed (i.e., triggered) by at least one processor (e.g., optical processor, electronic processor, electro-optical processor, etc.) coupled to the one or more lasers to generate the photonic input signal 306 of specific amplitudes, phases and/or modes (or wavelengths). The set of input ports of the nonlinear XOR photonic gate 315 may represent, e.g., a set of waveguides, a set of waveguide polarizations, a set of waveguide modes, a set of light wavelengths, etc. The photonic output signal 320 may be a light signal of corresponding output amplitudes (that each corresponds to logical "1" or logical "0"), corresponding output phase and/or corresponding output mode (i.e., output light spatial distribution and/or output wavelength) detected at an output port of the nonlinear XOR photonic gate 315. The output port of the nonlinear XOR photonic gate 315 may represent, e.g., a waveguide, a waveguide polarization, a waveguide mode, a light wavelength, a signal radiated by the nonlinear XOR photonic gate 315, etc. The output port of the nonlinear XOR photonic gate 315 may be an output port of the three-input XOR photonic gate 305. Details about a structure and operation of the nonlinear XOR photonic gate 315 are shown in relation to FIGS. 4A-4C.

Figure 4A:
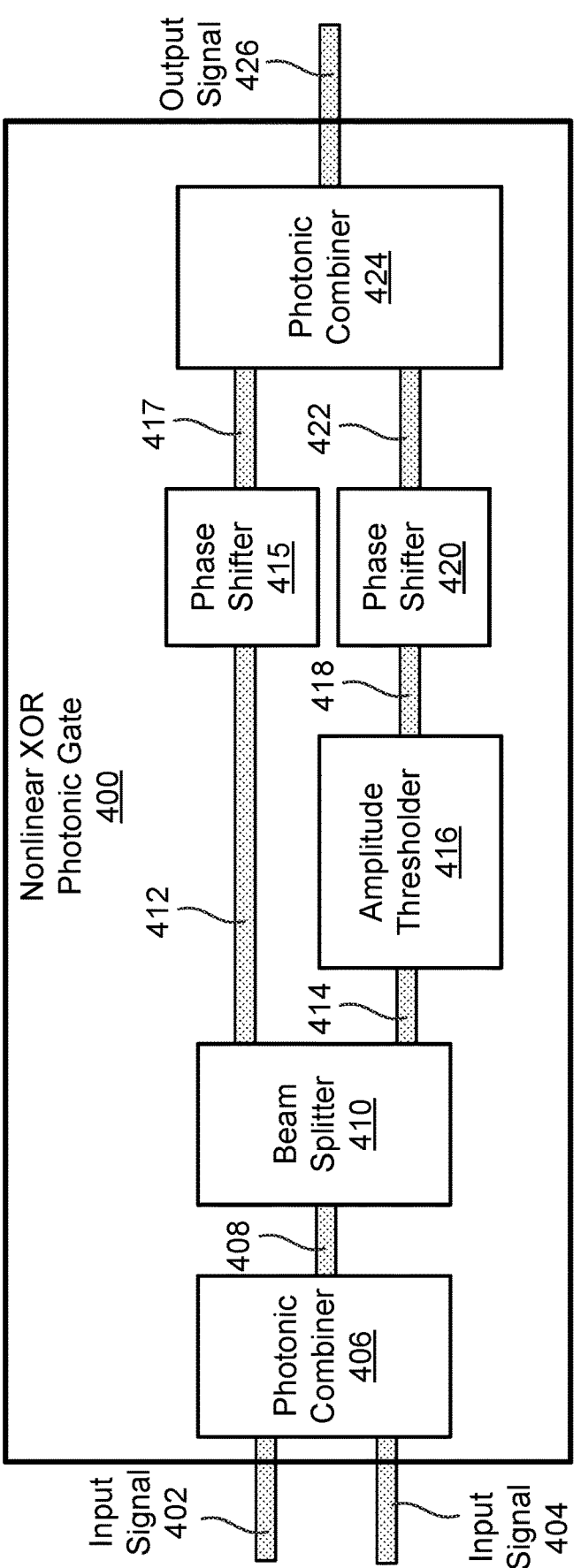
FIG. 4A illustrates an example two-input nonlinear XOR photonic gate used in the photonic full adder of FIG. 2 and in the three-input nonlinear XOR photonic gate of FIG. 3, in accordance with some embodiments.

FIG. 4A illustrates an example two-input nonlinear XOR photonic gate 400 used in the photonic full adder 205 and in the three-input XOR photonic gate 305, in accordance with some embodiments. The nonlinear XOR photonic gate 400 may be therefore utilized as part of the photonic full adders 116, 128, 130, 136, 140, 152, 154 of the photonic processor 100, as well as part of the photonic XOR gates 112 and 122 of the photonic processor 100. The nonlinear XOR photonic gate 400 may support operations on photonic signals having repetition rates of up to several terabits per second and clock periods of up to hundreds of femtoseconds.

The nonlinear XOR photonic gate 400 may include a photonic combiner 406, a beam splitter 410 connected to an output port of the photonic combiner 406, a phase shifter 415 connected to a first output port of the beam splitter 410, an amplitude thresholder 416 connected to a second output port of the beam splitter 410, a phase shifter 420 connected to an output port of the amplitude thresholder 416, and a photonic combiner 424 connected to an output port of the phase shifter 415 and an output port of the phase shifter 420. The nonlinear XOR photonic gate 400 may generate a photonic output signal 426 as the XOR logical function of photonic input signals 402, 404. Alternatively, the nonlinear XOR photonic gate 400 may be configured to perform some other or additional logic function. The nonlinear XOR photonic gate 400 may include fewer or additional components not shown in FIG. 4A, such as, but not limited to, additional phase shifters for compensation of fabrication variations, linear photonic amplifiers, and/or photonic attenuators.

The photonic combiner 406 may receive a pair of photonic input signals 402, 404 and generate a photonic signal 408 that represents a logical combination of the photonic input signals 402 and 404. Thus, the photonic combiner 406 operates as a linear OR photonic logic gate. The photonic input signals 402, 404 may be light signals of corresponding input amplitudes (that each corresponds to logical "1" or logical "0"), corresponding input phases and/or corresponding input modes (i.e., input light spatial distribution and/or input wavelengths) injected into a set of input ports of photonic combiner 406. The photonic input signals 402, 404 may be generated by an array of lasers (not shown in FIG. 4A). The array of lasers may be instructed (i.e., triggered) by at least one processor (e.g., optical processor, electronic processor, electro-optical processor, etc.) coupled to the array of lasers to generate the photonic input signals 402, 404 of specific amplitudes, phases and/or modes (or wavelengths). The set of input ports of the photonic combiner 406 may represent, e.g., a set of waveguides, a set of waveguide polarizations, a set of waveguide modes, a set of light wavelengths, etc. The photonic signal 408 may be a light signal of corresponding output amplitudes (that each corresponds to logical "1" or logical "0"), corresponding output phase and/or corresponding output mode (i.e., output light spatial distribution and/or output wavelength) detected at an output port of the photonic combiner 406. The output port of the photonic combiner 406 may represent, e.g., a waveguide, a waveguide polarization, a waveguide mode, a light wavelength, a signal radiated by the photonic combiner 406, etc. The photonic combiner 406 may pass the photonic signal 408 to the beam splitter 410.

The beam splitter 410 may receive the photonic signal 408 at its input port. The input port of the beam splitter 410 may represent, e.g., a waveguide, a waveguide polarization, a waveguide mode, a light wavelength, etc. The beam splitter 410 is a linear photonic component that splits the received photonic signal 408 into two photonic signals 412, 414. Each photonic signal 412, 414 may be output at a respective output port of the beam splitter 410. A set of output ports of the beam splitter 410 may represent, e.g., a set of waveguides, a set of waveguide polarizations, a set of waveguide modes, a set of light wavelengths, signals radiated by the beam splitter 410, etc. The photonic signals 412 and 414 produced by the beam splitter 410 may be passed to the phase shifter 415 and the amplitude thresholder 416, respectively.

The phase shifter 415 may receive the photonic signal 412 at its input port. The input port of the phase shifter 415 may represent, e.g., a waveguide, a waveguide polarization, a waveguide mode, a light wavelength, etc. The phase shifter 415 is a linear photonic component that generates a photonic signal 417 by shifting a phase of the received photonic signal 412. For example, the phase shifter 415 may apply a phase shift of $\pi$ radians to the photonic signal 412, i.e., the photonic signal 417 may represent an inverted version of the photonic signal 412. The photonic signal 417 may be output at an output port of the phase shifter 415. The output port of the phase shifter 415 may represent, e.g., a waveguide, a waveguide polarization, a waveguide mode, a light wavelength, a signal radiated by the phase shifter 415, etc. The photonic signal 417 generated by the phase shifter 415 may be passed to the photonic combiner 424.

The amplitude thresholder 416 may receive the photonic signal 414 at an input port of the amplitude thresholder 416. The input port of the amplitude thresholder 416 may represent, e.g., a waveguide, a waveguide polarization, a waveguide mode, a light wavelength, etc. The amplitude thresholder 416 may be a nonlinear photonic component that generates a photonic signal 418 by processing each amplitude of the received photonic signal 414 while operating in a first region of a transfer function of the amplitude thresholder 416 associated with a first operating regime (e.g., a region 455 in FIG. 4C), in a second region of the transfer function associated with a second operating regime (e.g., a region 457 in FIG. 4C), or in a third region of the transfer function associated with a third operating regime (e.g., a region 460 in FIG. 4C). An operating regime of the amplitude thresholder 416 may depend on a level of each amplitude of the photonic signal 414 that is input to the amplitude thresholder 416. The amplitude thresholder 416 may be silicon-based, e.g., made of silicon or silicon nitride, or made of some other non-silicon material. The amplitude thresholder 416 may saturate an amplitude of the photonic signal 414 to a first amplitude level, when the amplitude thresholder 416 operates in the first. The amplitude thresholder 416 may process an amplitude of the photonic signal 414 by applying a transfer gain of the second region to generate an amplitude of the photonic signal 418, when the amplitude thresholder 416 operates in the second region. And, the amplitude thresholder 416 may saturate an amplitude of the photonic signal 414 to a second amplitude level, when the amplitude thresholder 416 operates in the third region.

Alternatively, the amplitude thresholder 416 may be implemented as a nonlinear optical saturable absorber that absorbs incoming light with amplitudes above a threshold level and outputs light having a sequence of thresholded amplitudes. The nonlinear optical saturable absorber may be implemented as, e.g., a saturable absorber including based on graphene, Molybdenum disulfide (MoS2) or other 2D materials, carbon nanotube, dye, unpumped gain medium, saturable semiconductor cavity laser mirror (generally referred to as a semiconductor saturable absorber mirror, SESAM), semiconductor absorber (e.g., quantum dot, semiconductor optical amplifier (SOA), ion-implanted, reverse-biased or unpumped semiconductor, etc.), or artificial saturable absorber (e.g., Kerr lensing device, nonlinear polarization rotation device, fiber loop mirror, etc.). The amplitude thresholder 416 implemented as the nonlinear optical saturable absorber may generate the photonic signal 418 by saturating (i.e., absorbing) an amplitude of the photonic signal 414 to a threshold amplitude level (e.g., approximately equal to zero) when operating in a first region of a transfer function of the amplitude thresholder 416 implemented as the nonlinear optical saturable absorber, which can be referred to as a first operating regime of the amplitude thresholder 416. Alternatively, the amplitude thresholder 416 implemented as the nonlinear optical saturable absorber may generate the photonic signal 418 by substantially propagating an amplitude of the photonic signal 414 when operating in a second region of the transfer function, which can be referred to as a second operating regime of the amplitude thresholder 416. An operating regime of the amplitude thresholder 416 implemented as the nonlinear optical saturable absorber may depend on the amplitude of the photonic signal 414.

Since the amplitude thresholder 416 operating as the nonlinear optical saturable absorber may attenuate an amplitude of the photonic signal 414 when generating the photonic signal 418, one or more amplitudes of the photonic signal 418 may be substantially lower than one or more corresponding amplitudes of the photonic signal 412, which is not suitable for combining the photonic signals 412 and 418 (e.g., at the photonic combiner 424 after phase-shifting). To ensure that power levels of the photonic signals 412 and 418 are at desired levels, a variable optical attenuator or a SOA operating in a linear region (e.g., the region 457) may be included into each arm of the nonlinear XOR photonic gate 400 (e.g., at both output ports of the beam splitter 410, or at the first output port of the beam splitter 410 and at the output port of the amplitude thresholder 416).

Alternatively, the amplitude thresholder 416 may be implemented as a SOA-based amplitude thresholder. In such a case, the amplitude thresholder 416 may operate as a nonlinear active photonic amplifier that generates the photonic signal 418 by saturating an amplitude of the photonic signal 414 to a defined amplitude level (e.g., above zero amplitude level) while being configured to operate in a first region of a transfer function of the SOA-based amplitude thresholder. Or the amplitude thresholder 416 implemented as the SOA-based amplitude thresholder may operate in a second region of the transfer function and generate the photonic signal 418 by applying a gain of the second region to an amplitude of the photonic signal 414. The amplitude thresholder 416 implemented as the SOA-based amplitude thresholder may operate in the first region or in the second region depending on an amplitude level of the photonic signal 414. Alternatively, the amplitude thresholder 416 may be implemented as some other photonic thresholding device. Alternatively, the amplitude thresholder 416 may include a cascading connection of one or more saturable absorbers and one or more SOA-based amplitude thresholders.

The photonic signal 418 generated by the amplitude thresholder 416 may be output at an output port of the amplitude thresholder 416. The output port of the amplitude thresholder 416 may represent, e.g., a waveguide, a waveguide polarization, a waveguide mode, a light wavelength, a signal radiated by the amplitude thresholder 416, etc. The amplitude thresholder 416 may pass the photonic signal 418 to the phase shifter 420.

The phase shifter 420 may receive the photonic signal 418 at its input port. The input port of the phase shifter 420 may represent, e.g., a waveguide, a waveguide polarization, a waveguide mode, a light wavelength, etc. The phase shifter 420 is a linear photonic component that generates a photonic signal 422 by shifting a phase of the received photonic signal 418. For example, the phase shifter 420 may apply a phase shift of π radians to the photonic signal 418, i.e., the photonic signal 422 may represent an inverted version of the photonic signal 418. The photonic signal 422 may be output at an output port of the phase shifter 420. The output port of the phase shifter 420 may represent, e.g., a waveguide, a waveguide polarization, a waveguide mode, a light wavelength, a signal radiated by the phase shifter 420, etc. The photonic signal 422 generated by the phase shifter 420 may be passed to the photonic combiner 424.

The photonic combiner 424 may receive, at its first input port, the photonic signal 417 generated by the phase shifter 415. The photonic combiner 424 may further receive, at its second input port, the photonic signal 422 generated by the phase shifter 420. The set of input ports of the photonic combiner 424 may represent, e.g., a set of waveguides, a set of waveguide polarizations, a set of waveguide modes, a set of light wavelengths, etc. The photonic combiner 424 may generate the photonic output signal 426 by combining the photonic signal 417 and the photonic signal 422. Thus, the photonic combiner 424 operates as a linear OR photonic logic gate. The photonic output signal 426 may be output at an output port of the photonic combiner 424. The output port of the photonic combiner 424 may represent, e.g., a waveguide, a waveguide polarization, a waveguide mode, a light wavelength, a signal radiated by the photonic combiner 424, etc. The photonic output signal 426 may represent a resulting light signal of the XOR logic operation of the photonic input signal 402 and the photonic input signal 404. Since the photonic output signal 426 together with the photonic input signals 402 and 404 form an accurate truth table of the XOR logic function (i.e., no errors are propagated to the photonic output port of the nonlinear XOR photonic gate 400), the nonlinear XOR photonic gate 400 is cascadable, i.e., the nonlinear XOR photonic gate 400 can be directly connected with other photonic circuits within the photonic processor 100.

Figure 4B:
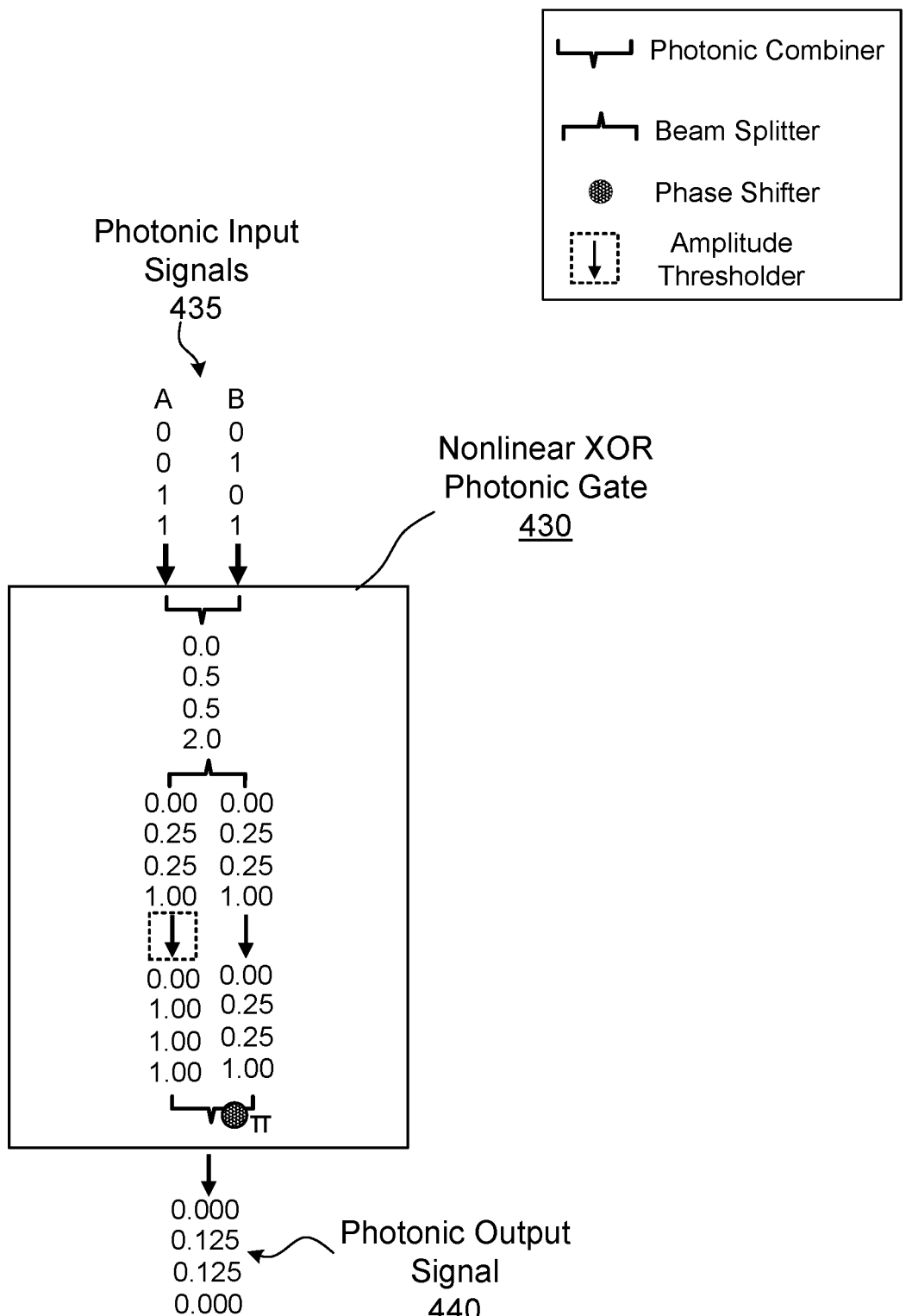
FIG. 4B illustrates an example XOR logical operation of the nonlinear XOR photonic gate in FIG. 4A, in accordance with some embodiments.

FIG. 4B illustrates an example XOR logic operation of the nonlinear XOR photonic gate 400, in accordance with some embodiments. A nonlinear XOR photonic gate 430 shown in FIG. 4B may be an embodiment of the nonlinear XOR photonic gate 400. The nonlinear XOR photonic gate 430 receives a pair of photonic input signals 435, A and B. The photonic input signals 435, A and B, may be light signals of corresponding input amplitudes (that each corresponds to logical "1" or logical "0"), corresponding input phases and/or corresponding input modes (i.e., input light spatial distribution and/or input wavelengths) injected into a set of input ports of the nonlinear XOR photonic gate 430. For example, the photonic input signal A has a variable amplitude over time having the amplitude sequence of "0 0 1 1"; and the photonic input signal B has a variable amplitude over time having the amplitude sequence of "0 1 0 1. The photonic input signals 435, A and B, may represent examples of the photonic input signals 402 and 404.

The photonic input signals 435, A and B, may be input into a first photonic combiner of the nonlinear XOR photonic gate 430 (e.g., an embodiment of the photonic combiner 406). The first photonic combiner of the nonlinear XOR photonic gate 430 may combine the first photonic input signal A with the photonic input signal B to generate a combined photonic signal having the amplitude sequence of "0.0 0.5 0.5 2.0". Note that an amplitude level of "2.0" in the combined photonic signal refers to a "third amplitude level", which is higher relative to other two amplitude levels of "0" and "1". Also, the amplitude level of "0.5" in the combined photonic signal corresponds to an amplitude level that is higher relative to the amplitude level of "0", but lower relative to the amplitude level of "1".

The combined photonic signal having the amplitude sequence of "0.0 0.5 0.5 2.0" may be passed onto a beam splitter of the nonlinear XOR photonic gate 430 (e.g., an embodiment of the beam splitter 410). The beam splitter of the nonlinear XOR photonic gate 430 may split the amplitude sequence of "0.0 0.5 0.5 2.0" into a pair of photonic signals each having the amplitude sequence of "0.00 0.25 0.25 1.00". Note that the amplitude level of "0.25" corresponds to an amplitude level that is higher than the amplitude level of "0" but lower than the amplitude level of "0.5". A first photonic signal having the amplitude sequence of "0.00 0.25 0.25 1.00" may be passed to a phase shifter of the nonlinear XOR photonic gate 430 (e.g., an embodiment of the phase shifter 415). A second photonic signal having the amplitude sequence of "0.00 0.25 0.25 1.00" may be passed to a nonlinear amplitude thresholder of the nonlinear XOR photonic gate 430 (e.g., an embodiment of the amplitude thresholder 416).

Figure 4C:
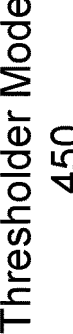
FIG. 4C illustrates an example model of a nonlinear amplitude thresholder of the nonlinear XOR photonic gate in FIG. 4A, in accordance with some embodiments.
Figure 4C:
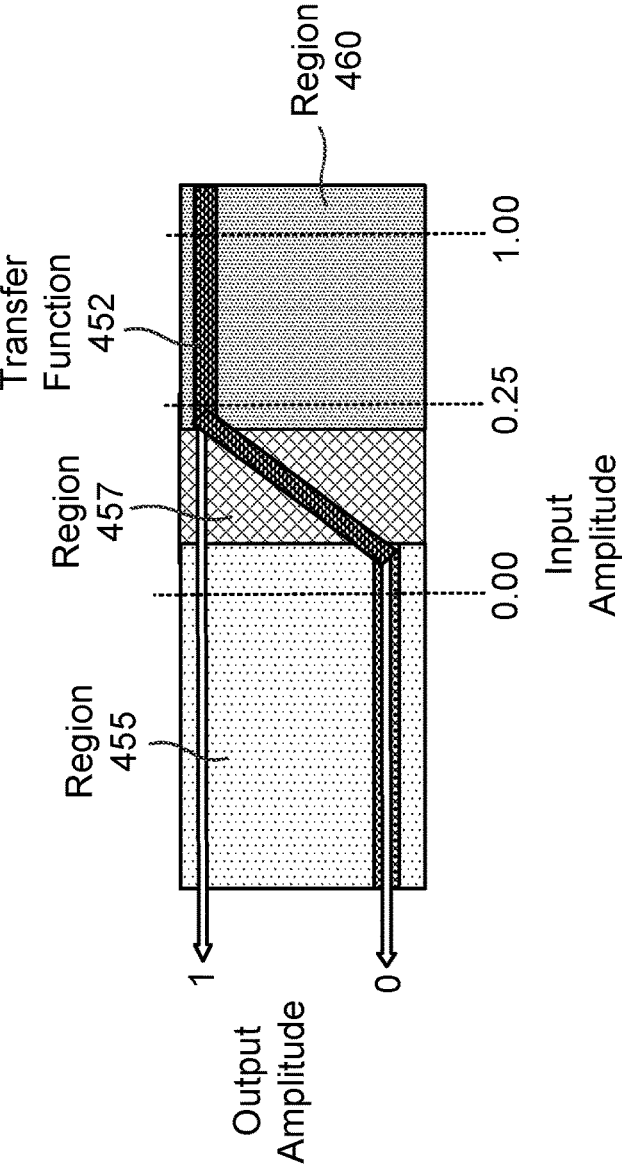

FIG. 4C illustrates an example model 450 of the nonlinear amplitude thresholder applied within the nonlinear XOR photonic gate 430, in accordance with some embodiments. The nonlinear amplitude thresholder of the nonlinear XOR photonic gate 430 (e.g., an embodiment of the amplitude thresholder 416) may be a nonlinear component that generates a photonic thresholding signal having the amplitude sequence of "0.00 1.00 1.00 1.00" based on the second photonic signal having the amplitude sequence of "0.00 0.25 0.25 1.00". The nonlinear amplitude thresholder has a transfer function 452 and may operate in the region 455, the region 457, or the region 460 depending on the amplitude of the second photonic signal into the nonlinear amplitude thresholder. In some embodiments, the regions 455 and 460 are approximately nonlinear regions of the transfer function 452, and the region 457 is approximately linear region of the transfer function 452. When the amplitude of the second photonic signal is "0.00", the nonlinear amplitude thresholder may operate in the region 455 and output the photonic thresholding signal having the saturated amplitude of "0" (or, equivalently, "0.00"). And, when the amplitude of the second photonic signal is "0.25" or "1.00" (e.g., equal to or greater than "0.25"), the nonlinear amplitude thresholder may operate in the region 460 and output the photonic thresholding signal having the saturated amplitude of "1" (or, equivalently, "1.00"). The nonlinear amplitude thresholder may pass the photonic thresholding signal having the amplitude sequence of "0.00 1.00 1.00 1.00" to a second photonic combiner of the nonlinear XOR photonic gate 430 (e.g., an embodiment of the photonic combiner 424).

Referring back to FIG. 4B, the phase shifter of the nonlinear XOR photonic gate 430 may perform phase shifting of the first photonic signal having the amplitude sequence of "0.00 0.25 0.25 1.00" (e.g., by π radians) to effectively invert the first photonic signal. An inverted version of the first photonic signal having the amplitude sequence of "0.00-0.25-0.25-1.00" may be passed onto the second photonic combiner of the nonlinear XOR photonic gate 430. Note that the amplitude level of "−1" refers to the same amplitude level of "1" but having a shifted phase by π radians relative to the amplitude level of "1". Similarly, the amplitude level of "−0.25" refers to the same amplitude level of "0.25" but having a shifted phase by π radians relative to the amplitude level of "0.25".

The second photonic combiner of the nonlinear XOR photonic gate 430 may combine the phase-shifted version of the first photonic signal having the amplitude sequence of "0.00-0.25-0.25-1.00" with the photonic thresholding signal having the amplitude sequence of "0.00 1.00 1.00 1.00" to generate a photonic output signal 440 having the amplitude sequence of "0.000 0.125 0.125 0.000". Note that the amplitude value of "0.125" may correspond to an amplitude level lower than the amplitude level of "0.25" but higher than the amplitude level of "0". As the amplitude level of "0.000" corresponds to the "low" logic value and the amplitude level of "0.125" corresponds to the "high" logic value, the photonic output signal 440 represents a correct result of the XOR logical operation between the photonic input signal A and the photonic input signal B. The photonic output signal 440 having the amplitude sequence of "0.000 0.125 0.125 0.000" may be an example of the photonic output signal 426. It should be understood that example parameters of the nonlinear XOR photonic gate 430 shown in FIG. 4B and FIG. 4C (e.g., parameters of the thresholder model 450) represent one possible embodiment of the nonlinear XOR photonic gate 400, and that other example parameters are possible that result in the XOR logical operation or some other logical operation of the nonlinear XOR photonic gate 400.

Example Linear Photonic Gate

Figure 5:
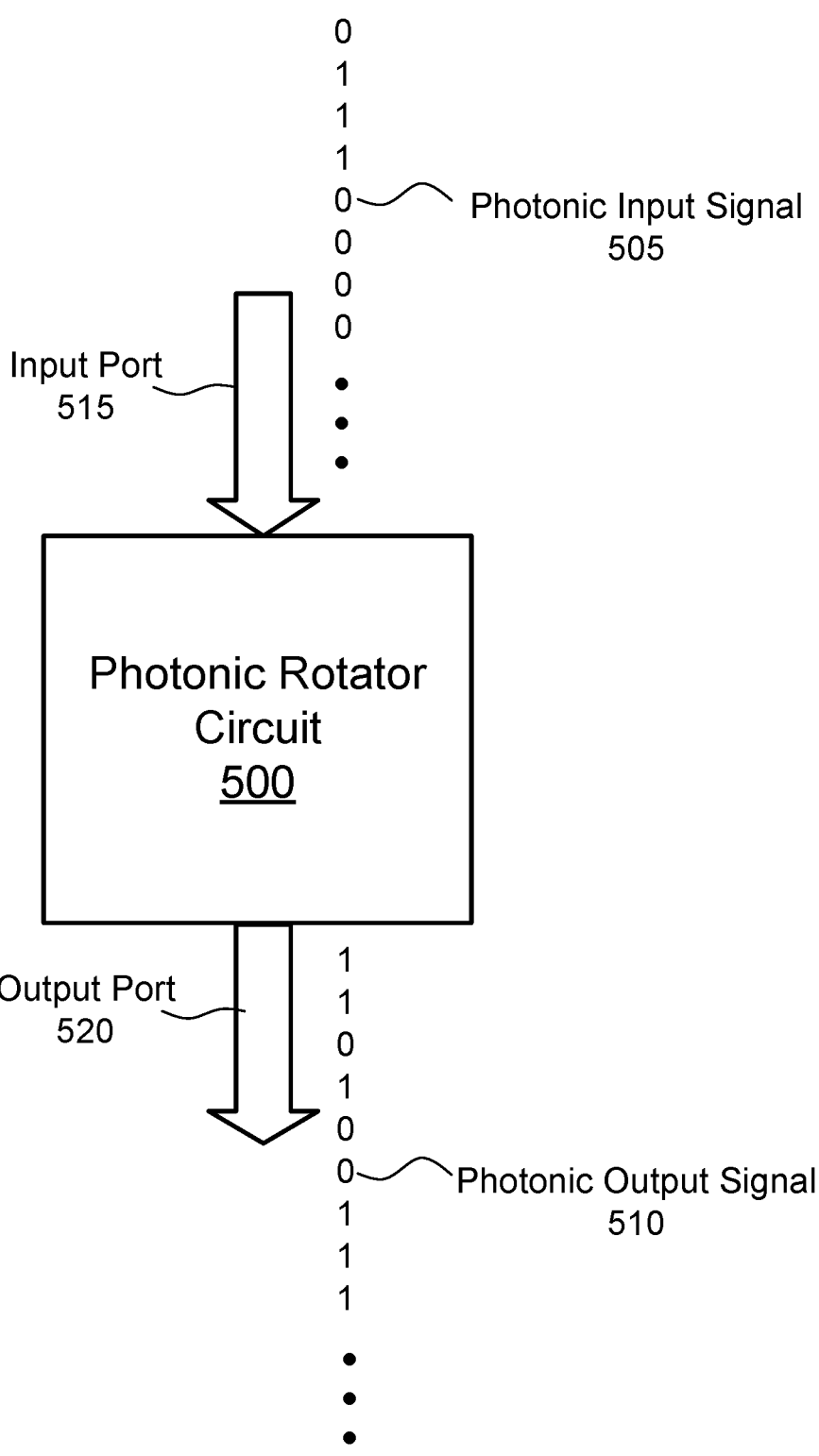
FIG. 5 illustrates an example photonic rotation circuit used in the photonic processor of FIG. 1, in accordance with some embodiments.

FIG. 5 illustrates an example photonic rotator circuit 500 used in the photonic processor 100, in accordance with some embodiments. The photonic rotator circuit 500 may be employed as part of the photonic circuits 106 and 108. The photonic rotator circuit 500 may receive a photonic input signal 505 and generate a photonic output signal 510 by shifting in time (i.e., rotating) amplitude values of the photonic input signal 505. Thus, the photonic rotation circuit 500 may effectively operate as a passive linear phase shifter that shifts a phase of the photonic input signal 505 in time to generate the photonic output signal 510 as a rotated version of the photonic input signal 505. The photonic rotation circuit 500 may be configured to receive a plurality of photonic input signals 505 in parallel and generate a plurality of photonic output signals 510 in parallel, where each photonic input signal 505 and each photonic output signal 510 have a respective wavelength of a plurality of wavelengths associated with the plurality of photonic input signals 505.

Each photonic input signal 505 that is input into the photonic rotation circuit 500 may be a time series light signal of corresponding input amplitudes that change over time (which correspond to a sequence of logical "1s" and logical "0s", as shown in FIG. 5), having a corresponding input phase and corresponding input mode (i.e., input light spatial distribution and/or input wavelength) injected into an input port 515 of the photonic rotation circuit 500. The input port 515 may be, e.g., an input waveguide configured to in-couple a light signal. Similarly, each photonic output signal 510 generated by the photonic rotation circuit 500 may be a time series light signal of corresponding output amplitudes that change over time (which correspond to a sequence of logical "1s" and logical "0s", as shown in FIG. 5), having a corresponding input phase and corresponding input mode (i.e., input light spatial distribution and/or input wavelength) detected at an output port 520 of the photonic rotation circuit 500. The output port 520 may be, e.g., an output waveguide configured to out-couple a light signal.

Example Process Flow

FIG. 6 is a flowchart illustrating an example method 600 for operating a photonic processor with multiple layers of feedback, in accordance with some embodiments. The operations of method 600 may be performed at, e.g., the photonic processor 100. The photonic processor may be implemented as a silicon photonics platform. The photonic processor may be deployed in a computing system that can further include a non-transitory computer-readable storage medium (e.g., optical, electrical, or electro-optical memory) for storing computer-executable instructions and data. The computing system may be an optical computing system, an electronic computing system, an electro-optical computing system, some other type of computing system, or some combination thereof.

The photonic processor generates 605 (e.g., via one or more photonic input circuits of the photonic processor 100), one or more photonic output values based on one or more photonic input signals. The photonic processor may receive (e.g., via the one or more photonic input circuits) the one or more photonic input signals including one or more keys and one or more input messages. The one or more photonic input circuits may comprise a photonic adder (e.g., the photonic full adder 128) that includes a first input configured to receive a key of the one or more keys, a second input configured to receive the one or more input messages, and a feedback path configured to feed a feedback signal from a carry output of the photonic adder to a third input of the photonic adder. The photonic adder may generate a photonic output value of the one or more photonic output values, based on the received key, the one or more input messages and the feedback signal. The one or more photonic input circuits may further comprise one or more nonlinear photonic XOR gates (e.g., the XOR photonic gates 112, 122) that include one or more nonlinear amplitude thresholders. The one or more photonic input circuits may comprise at least one of: one or more photonic splitters (e.g., the photonic splitters/crossing gates 102, 104), one or more photonic crossing gates (e.g., the photonic splitters/crossing gates 102, 104), one or more photonic rotator circuits (e.g., as part of the photonic circuits 106, 108), one or more nonlinear XOR photonic gates (e.g., the XOR photonic gates 112, 122), one or more photonic majority logic gates (e.g., the photonic majority logic gate 110), and one or more photonic choose logic gates (e.g., the photonic choose logic gate 126). The one or more photonic input circuits may comprise one or more photonic rotator circuits (e.g., as part of the photonic circuits 102, 104). Each of the one or more photonic rotator circuits (e.g., the photonic rotator circuit 500) may receive a time series photonic input and generate a time series photonic output as a time-shifted version of the time series photonic input.

The photonic processor receives 610 (e.g., by at least one first adder of a first set of one or more photonic adders of the photonic processor 100, such as the photonic full adders 116, 130, 136), a first feedback signal from a first carry output of the at least one first photonic adder. The at least one first photonic adder may include a feedback path configured to feed the first feedback signal from the carry output of the at least one first photonic adder to an input of the at least one first photonic adder.

The photonic processor generates 615 (e.g., by the at last one first photonic adder), a photonic sum of one or more photonic sums, based at least in part on a portion of the one or more photonic output values and the first feedback signal. The first set of one or more photonic adders may comprise a photonic adder (e.g., the photonic full adder 136) that includes a first input configured to receive a first photonic sum value output from another photonic adder of the one or more photonic input circuits (e.g., the photonic full adder 128), a second input configured to receive a key of the one or more keys, a feedback path configured to feed a feedback signal from a carry output of the photonic adder to a third input of the photonic adder. The photonic adder may generate a second photonic sum value, based on the first photonic sum value, the key and the feedback signal. A photonic adder of the first set of one or more photonic adders (e.g., the photonic full adder 136) may comprise an input that directly receives a key of the one or more keys (e.g., the key K). The at least one first photonic adder may comprise one or more nonlinear amplitude thresholders. The at least one first photonic adder may include one or more nonlinear XOR photonic gates (e.g., the nonlinear photonic XOR photonic gate 305) comprising a cascaded connection of at least one of: one or more photonic combiners, one or more beam splitters, one or more nonlinear amplitude thresholders, and one or more phase shifters.

In some embodiments, the photonic processor includes a photonic adder (e.g., the photonic full adder 140) that includes at least a pair of inputs configured to receive a pair of photonic sum values output from a pair of photonic adders of the first set of one or more photonic adders (e.g., the photonic full adders 130, 136), a feedback path configured to feed a feedback signal from a carry output of the photonic adder to another input of the photonic adder. One or more outputs of the photonic adder may output a photonic sum value generated based on the pair of photonic sum values and the feedback signal. The photonic adder may provide the photonic sum value to a second set of one or more photonic adders (e.g., the photonic full adders 152, 154). In some embodiments, the photonic processor further includes a beam splitter (e.g., the splitter 146) coupled to the photonic adder and the second set of one or more photonic adders. The beam splitter may receive the photonic sum value and split the received photonic sum value into a first photonic sum value and a second photonic sum value. The photonic beam splitter may then provide the first photonic sum value to a first photonic adder of the second set of one or more photonic adders (e.g., the photonic full adder 152) and provide the second photonic sum value to a second photonic adder of the second set of one or more photonic adders (e.g., the photonic full adder 154).

The photonic processor receives 620 (e.g., by the at least one second photonic adder), a second feedback signal from a carry output of the at least one second photonic adder. The at least one second photonic adder may include a feedback path configured to feed the second feedback signal from the carry output of the at least one second photonic adder to a an input of the at least one second photonic adder.

The photonic processor generates 625 (e.g., by the at least one second photonic adder), an updated version of a photonic input signal of the one or more photonic input signals, based at least in part on a portion of the one or more photonic sums and the second feedback signal. The photonic processor may generate (e.g., by the at least one second photonic adder) the updated version of the photonic input signal that includes an updated value of a key of the one or more keys. The photonic processor may generate (e.g., by the at least one second photonic adder), after a defined number of iterations of the photonic processor and based on the updated value of the key, a portion of a hash value (e.g., the photonic output signals 156 and 160). The photonic processor may further include a feedback interface (e.g., the feedback interface 164) coupling one or more outputs of the at least one second photonic adder with one or more photonic input of a photonic input circuit of the one or more photonic input circuits. The feedback interface may feed the updated version of the photonic input signal (e.g., the updated value of the key) back to the photonic input circuit.

A photonic adder of the second set of one or more photonic adders (e.g., the photonic full adder 154) may comprise an input that directly receives a key of the one or more keys (e.g., the key D). Each of the second plurality of photonic adders may comprise at least one nonlinear photonic thresholder. The at least one second photonic adder may include one or more nonlinear XOR photonic gates (e.g., the nonlinear XOR photonic gate 305) comprising a cascaded connection of at least one of: one or more photonic combiners, one or more beam splitters, one or more nonlinear amplitude thresholders, and one or more phase shifters.

By exploiting multiple layers of feedback, the photonic processor presented herein provides for a decrease in a die area compared to photonic processors that do not utilize this feedback mechanism, while preserving an energy efficiency and supporting high processing data rates (e.g., hash rates). This is achieved by implementing a processing algorithm (e.g., secure hash algorithm, ML algorithm, or some other algorithm) using a smaller number of photonic circuits on a silicon photonics platform when employing multiple layers of feedback. A high throughput is achieved by exploiting a low latency offered by optical interconnects, linear photonic logic gates, nonlinear photonic logic gates, high data rate photonic input signals, wavelength-division multiplexing, etc. A high compute density and low power consumption can be achieved by utilizing waveguides for propagating photonic signals. Furthermore, the photonic processor presented herein does not require any memory to store data and thus overcomes the need of data convertors.

Additional Considerations

The disclosed configurations beneficially provide for efficient design of photonic logic gates while substantially reducing a number of required numerical design simulations.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to effectively convey the substance of their work to others skilled in the art. While described functionally, computationally, or logically, these operations are understood to be implemented by computer programs or equivalent electrical circuits, microcode, or the like. Furthermore, at times, it has also proven convenient to refer to these arrangements of operations as modules without loss of generality. The described operations and associated modules can be embodied in software, firmware, hardware, or some combination thereof.

Any steps, operations, or processes described herein can be performed or implemented with one or more hardware or software modules, alone or in combination with other devices. In one embodiment, a software module is implemented with a computer program product comprising a computer-readable medium containing computer program code, which a computer processor can execute for performing any or all of the steps, operations, or processes described herein.

Embodiments of the disclosure can also relate to an apparatus for performing the operations herein. This apparatus can be specially constructed for the required purposes, and/or it can comprise a general-purpose computing device selectively activated or reconfigured by a computer program stored in the computer. Such a computer program can be stored in a non-transitory, tangible computer-readable storage medium or any media suitable for storing electrical instructions coupled to a computer system bus. Furthermore, any computing systems referred to in the specification can include a single processor or architectures employing multiple processor designs for increased computing capability.

Some embodiments of the present disclosure can further relate to a system comprising a processor, at least one computer processor, and a non-transitory computer-readable storage medium. The storage medium can store computer-executable instructions, which, when executed by the compiler operating on at least one computer processor, cause at least one computer processor to be operable for performing the operations and techniques described herein.

Finally, the language used in the specification has been principally selected for readability and instructional purposes, and it has not been selected to delineate or circumscribe the inventive subject matter. It is therefore intended that the scope of the disclosure be limited not by this detailed description but rather by any claims that issue on an application based hereon. Accordingly, the disclosure of the embodiments is intended to be illustrative, but not to limit the scope of the disclosure, which is set forth in the following claims.

What is claimed is:

1. A photonic processor, comprising:
one or more photonic input circuits having one or more inputs to receive one or more photonic input signals, the one or more photonic input circuits configured to generate one or more photonic output values based on the one or more photonic input signals;
a first set of one or more photonic adders coupled to the one or more photonic input circuits, at least one first photonic adder of the first set of one or more photonic adders including a first feedback path configured to feed a first feedback signal from a first carry output of the at least one first photonic adder to a first input of the at least one first photonic adder, the at least one first photonic adder configured to generate a photonic sum of one or more photonic sums based at least in part on a portion of the one or more photonic output values and the first feedback signal; and
a second set of one or more photonic adders coupled to the first set of one or more photonic adders, at least one second photonic adder of the second set of one or more photonic adders including a second feedback path configured to feed a second feedback signal from a second carry output of the at least one second photonic adder to a second input of the at least one second photonic adder, the at least one second photonic adder configured to generate an updated version of a photonic input signal of the one or more photonic input signals based at least in part on a portion of the one or more photonic sums and the second feedback signal.

2. The photonic processor of claim 1, further comprising a feedback interface coupling one or more output of the at least one second photonic adder with the one or more inputs of the one or more photonic input circuits, the feedback interface configured to feed the updated version of the photonic input signal back to the one or more photonic input circuits.

3. The photonic processor of claim 1, wherein:
the one or more photonic input circuits are further configured to receive the one or more photonic input signals including one or more keys and one or more input messages; and
the at least one second photonic adder is further configured to:
generate the updated version of the photonic input signal that includes an updated value of a key of the one or more keys, and
generate, after a defined number of iterations of the photonic processor and based on the updated value of the key, a portion of a hash value.

4. The photonic processor of claim 3, wherein the one or more photonic input circuits include a photonic adder, the photonic adder comprising:
a first input configured to receive a key of the one or more keys;
a second input configured to receive the one or more input messages; and
a third feedback path configured to feed a third feedback signal from a third carry output of the photonic adder to a third input of the photonic adder, wherein
the photonic adder is configured to generate a photonic output value of the one or more photonic output values, based on the key, the one or more input messages and the third feedback signal.

5. The photonic processor of claim 3, wherein the first set of one or more photonic adders includes a photonic adder, the photonic adder comprising:
a first input configured to receive a first photonic sum value output from another photonic adder of the one or more photonic input circuits;
a second input configured to receive a key of the one or more keys; and
a third feedback path configured to feed a third feedback signal from a third carry output of the photonic adder to a third input of the photonic adder, wherein
the photonic adder is configured to generate a second photonic sum value, based on the first photonic sum value, the key and the third feedback signal.

6. The photonic processor of claim 3, wherein a photonic adder of the first set of one or more photonic adders comprises a first input that directly receives a key of the one or more keys, and a photonic adder of the second set of one or more photonic adders comprises a second input that directly receives another key of the one or more keys.

7. The photonic processor of claim 1, further comprising a photonic adder that includes:
at least a pair of inputs configured to receive a pair of photonic sum values output from a pair of photonic adders of the first set of one or more photonic adders;
a third feedback path configured to feed a third feedback signal from a third carry output of the photonic adder to another input of the photonic adder; and
one or more outputs configured to:

output a photonic sum value generated based on the pair of photonic sum values and the third feedback signal, and provide the photonic sum value to the second set of one or more photonic adders.

8. The photonic processor of claim 7, further comprising a beam splitter coupled to the photonic adder and the second set of one or more photonic adders, the beam splitter configured to:

receive the photonic sum value;

split the received photonic sum value into a first photonic sum value and a second photonic sum value;

provide the first photonic sum value to a first photonic adder of the second set of one or more photonic adders; and provide the second photonic sum value to a second photonic adder of the second set of one or more photonic adders.

9. The photonic processor of claim 1, wherein each of the at least one first photonic adder and the at least one second photonic adder comprises one or more nonlinear amplitude thresholders.

10. The photonic processor of claim 1, wherein the one or more photonic input circuits comprise one or more nonlinear XOR photonic gates that include one or more nonlinear amplitude thresholders.

11. The photonic processor of claim 1, wherein each of the at least one first photonic adder and the at least one second photonic adder includes one or more nonlinear XOR photonic gates, the one or more nonlinear XOR photonic gates comprises a cascaded connection of at least one of: one or more photonic combiners, one or more beam splitters, one or more nonlinear amplitude thresholders, and one or more phase shifters.

12. The photonic processor of claim 1, wherein the one or more photonic input circuits comprise at least one of: one or more photonic splitters, one or more photonic crossing gates, one or more photonic rotator circuits, one or more nonlinear XOR photonic gates, one or more photonic majority logic gates, and one or more photonic choose logic gates.

13. The photonic processor of claim 1, wherein the one or more photonic input circuits comprise one or more photonic rotator circuits, each of the one or more photonic rotator circuits configured to receive a time series photonic input and generate a time series photonic output as a time-shifted version of the time series photonic input.

14. A non-transitory computer-readable storage medium comprising stored instructions that, when executed by at least one processor, cause the at least one processor to:

instruct one or more photonic input circuits of a photonic processor to generate one or more photonic output values based on one or more photonic input signals;

instruct at least one first photonic adder of a first set of one or more photonic adders of the photonic processor to:

receive a first feedback signal from a first carry output of the at least one first photonic adder, and generate a photonic sum of one or more photonic sums, based at least in part on a portion of the one or more photonic output values and the first feedback signal; and instruct at least one second photonic adder of a second set of one or more photonic adders of the photonic processor to:

receive a second feedback signal from a second carry output of the at least one second photonic adder, and generate an updated version of a photonic input signal of the one or more photonic input signals, based at least in part on a portion of the one or more photonic sums and the second feedback signal.

15. The computer-readable storage medium of claim 14, wherein the stored instructions comprise further stored instructions that, when executed, cause the at least one processor to:

instruct the one or more photonic input circuits to receive the one or more photonic input signals including one or more keys and one or more input messages; and instruct the at least one second photonic adder to generate the updated version of the photonic input signal that includes an updated value of a key of the one or more keys.

16. The computer-readable storage medium of claim 15, wherein the stored instructions comprise further stored instructions that, when executed, cause the at least one processor to instruct the at least one second photonic adder to:

feed the updated value of the key back to a photonic input circuit of the one or more photonic input circuits; and generate, after a defined number of iterations of the photonic processor and based on the updated value of the key, a portion of a hash value.

17. The computer-readable storage medium of claim 15, wherein the stored instructions comprise further stored instructions that, when executed, cause the at least one processor to instruct a photonic adder of the one or more photonic input circuits to:

receive a key of the one or more keys;

receive the one or more input messages;

receive a third feedback signal from a third carry output of the photonic adder; and generate a photonic output value of the one or more photonic output values, based on the key, the one or more input messages and the third feedback signal.

18. The computer-readable storage medium of claim 14, wherein the stored instructions comprise further stored instructions that, when executed, cause the at least one processor to instruct a photonic adder of the photonic processor to:

receive at least a pair of photonic sum values output from a pair of photonic adders of the first set of one or more photonic adders;

receive a third feedback signal from a third carry output of the photonic adder;

generate a photonic sum value, based on the pair of photonic sum values and the third feedback signal; and provide the photonic sum value to the second set of one or more photonic adders.

19. The computer-readable storage medium of claim 14, wherein each of the at least one first photonic adder and the at least one second photonic adder includes one or more nonlinear XOR photonic gates, the one or more nonlinear XOR photonic gates comprises a cascaded connection of at least one of: one or more photonic combiners, one or more beam splitters, one or more nonlinear amplitude thresholders, and one or more phase shifters.

20. A method comprising:

generating, by one or more photonic input circuits of a photonic processor, one or more photonic output values based on one or more photonic input signals;

receiving, by at least one first photonic adder of a first set of one or more photonic adders of the photonic processor, a first feedback signal from a first carry output of the at least one first photonic adder;

generating, by the at least one first photonic adder, a photonic sum of one or more photonic sums, based at least in part on a portion of the one or more photonic output values and the first feedback signal;

receiving, by at least one second photonic adder of a second set of one or more photonic adders of the photonic processor, a second feedback signal from a second carry output of the at least one second photonic adder; and generating, by the at least one second photonic adder, an updated version of a photonic input signal of the one or more photonic input signals, based at least in part on a portion of the one or more photonic sums and the second feedback signal.

* * * * *